United States Patent
Li et al.

(10) Patent No.: US 8,619,540 B2
(45) Date of Patent: Dec. 31, 2013

(54) APPARATUS AND METHOD FOR TRANSMITTING AND RECEIVING UPLINK SOUNDING SIGNAL IN BROADBAND WIRELESS COMMUNICATION SYSTEM

(75) Inventors: Jing Li, Suwon-si (KR); Soon-Young Yoon, Seoul (KR); Keun-Chul Hwang, Yongin-si (KR); In-Seok Hwang, Seoul (KR); June Moon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 646 days.

(21) Appl. No.: 12/657,343

(22) Filed: Jan. 19, 2010

(65) Prior Publication Data
US 2010/0182898 A1   Jul. 22, 2010

(30) Foreign Application Priority Data

| Jan. 22, 2009 | (KR) | 10-2009-0005707 |
| Jan. 29, 2009 | (KR) | 10-2009-0007158 |
| Feb. 27, 2009 | (KR) | 10-2009-0016676 |
| Apr. 9, 2009 | (KR) | 10-2009-0030795 |

(51) Int. Cl.
H04J 11/00 (2006.01)
H04J 7/02 (2006.01)

(52) U.S. Cl.
USPC ........... 370/208; 370/210; 370/330; 370/332; 375/267; 375/343

(58) Field of Classification Search
USPC .......... 370/208–210, 328–332, 336; 375/140, 375/260, 267, 295, 343; 455/509
See application file for complete search history.

(56) References Cited

U.S. PATENT DOCUMENTS

| 2008/0316957 A1* | 12/2008 | Shen et al. ................... 370/328 |
| 2008/0318608 A1* | 12/2008 | Inoue et al. .................. 455/509 |
| 2009/0201877 A1* | 8/2009 | Noh et al. .................... 370/330 |
| 2010/0067464 A1* | 3/2010 | Higuchi ....................... 370/329 |
| 2010/0182979 A1* | 7/2010 | Malladi et al. ............... 370/336 |
| 2011/0216713 A1* | 9/2011 | Kim et al. .................... 370/329 |
| 2011/0305226 A1* | 12/2011 | Zhang et al. ................. 370/336 |

FOREIGN PATENT DOCUMENTS

| CN | 101166352 A | 4/2008 |
| CN | 101325426 A | 12/2008 |
| EP | 1 942 596 A3 | 7/2008 |
| EP | 2 007 021 A1 | 12/2008 |

OTHER PUBLICATIONS

European Search Report and Written Opinion dated Apr. 28, 2010 in connection with European Application No. 10150881.0.
Chinese Office Action dated Jul. 23, 2013 in connection with Chinese Application No. 201010106817.9, 22 pages.

* cited by examiner

*Primary Examiner* — Michael Thier
*Assistant Examiner* — Awet Haile

(57) ABSTRACT

A terminal is capable of transmitting an orthogonal sequence in a broadband wireless communication system. Operations of a transmitting end include generating a sequence corresponding to sequence allocation information of the transmitting end among a plurality of candidate sequences; generating a signal string corresponding to the sequence; and transmitting the signal string over a channel defined for transmission of the signal string.

36 Claims, 13 Drawing Sheets

APPARATUS AND METHOD FOR TRANSMITTING AND RECEIVING UPLINK SOUNDING SIGNAL IN BROADBAND WIRELESS COMMUNICATION SYSTEM

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Jan. 22, 2009 and assigned Serial No. 10-2009-0005707, a Korean patent application filed in the Korean Intellectual Property Office on Jan. 29, 2009 and assigned Serial No. 10-2009-0007158, a Korean patent application filed in the Korean Intellectual Property Office on Feb. 27, 2009 and assigned Serial No. 10-2009-0016676, and a Korean patent application filed in the Korean Intellectual Property Office on Apr. 9, 2009 and assigned Serial No. 10-2009-0030795, the entire disclosures of which are hereby incorporated by reference.

TECHNICAL FIELD OF THE INVENTION

The present invention relates generally to a broadband wireless communication system. More particularly, the present invention relates to an apparatus and a method for transmitting and receiving an uplink sounding signal in the broadband wireless communication system.

BACKGROUND OF THE INVENTION

A fourth generation (4G) communication system, which is a next-generation communication system, is under development to provide users with services of various Quality of Service (QoS) levels at a data rate of about 100 Mbps. Particularly, the 4 G communication systems are advancing in order to support high speed services by guaranteeing mobility and QoS in Broadband Wireless Access (BWA) communication systems such as local area network systems and wireless metropolitan area network systems. Representative examples include an Institute of Electrical and Electronics Engineers (IEEE) 802.16 communication system.

According to the IEEE 802.16 system standard, a terminal transmits an uplink sounding signal to estimate a channel of a base station. Mostly, the sounding signal is defined as a set of orthogonal sequences, and the terminal transmits the sounding signal generated from one of the sequences. A plurality of terminals can transmit their sounding signals over the same resource. Hence, it is quite important to prevent interference between the sounding signals by maintaining the orthogonality between the sounding sequences. In a multi-cell environment, the same resource in the cells can be used as the sounding channel. In this case, the same sounding signals can be transmitted over the same resources in the neighboring cells, which cause Inter Cell Interference (ICI) of the sounding signal. That is, in the multi-cell environment, the ICI may greatly degrade the sounding performance.

Similar to the sounding signal, the ICI affects the system performance in relation to a reference signal transmitted in the downlink. The reference signal can be called a pilot signal. To compensate distortion of a data signal, the terminal needs to estimate the channel condition. The reference signal is used to estimate the channel condition. When the ICI occurs in the reference signal, the terminal can not accurately estimate the channel condition with a serving base station and not accurately estimate the distortion of the data signal. Consequently, the data transfer rate deteriorates. The reference signal is constituted in the form of the sequence similar to the sounding signal.

Thus, a solution is demanded to maintain the orthogonality between the sequences and to prevent the ICI for the sounding signal or the reference signal by obtaining the sequences as many as possible within the limited length.

SUMMARY OF THE INVENTION

To address the above-discussed deficiencies of the prior art, it is a primary aspect of the present invention to provide an apparatus and a method for enhancing sounding performance in a broadband wireless communication system.

Another aspect of the present invention is to provide an apparatus and a method for reducing Inter Cell Interference (ICI) of a sounding signal in a broadband wireless communication system.

Yet another aspect of the present invention is to provide an apparatus and a method for sounding using a number of sounding signals in a broadband wireless communication system.

Still another aspect of the present invention is to provide an apparatus and a method for generating a sounding sequence applicable to various sequence lengths in a broadband wireless communication system.

A further aspect of the present invention is to provide an apparatus and a method for ensuring orthogonality of sequences for a sounding signal or a reference signal in a broadband wireless communication system.

According to one aspect of the present invention, an operating method of a transmitting end of an orthogonal sequence in a broadband wireless communication system includes generating a sequence corresponding to sequence allocation information of the transmitting end among a plurality of candidate sequences; generating a signal string corresponding to the sequence; and transmitting the signal string over a channel defined for transmission of the signal string. The sequence allocation information indicates a combination of at least one of a sequence length, a Zadoff-Chu sequence root index, orthogonal code indexes, and a cyclic shift offset. The plurality of the candidate sequences is obtained by extending a product of a covering code comprising a plurality of orthogonal codes and a Zadoff-Chu sequence through cyclic shift and multiplying a master covering sequence.

According to another aspect of the present invention, an operating method of a receiving end of an orthogonal sequence in a broadband wireless communication system includes generating a sequence corresponding to sequence allocation information of a transmitting end among a plurality of candidate sequences; and correlating a signal string received over a channel defined for transmission of the sequence with the sequence. The sequence allocation information indicates a combination of at least one of a sequence length, a Zadoff-Chu sequence root index, orthogonal code indexes, and a cyclic shift offset. The candidate sequences are obtained by extending a product of a covering code comprising a plurality of orthogonal codes and a Zadoff-Chu sequence through cyclic shift and multiplying a master covering sequence.

According to yet another aspect of the present invention, an apparatus of a transmitting end of an orthogonal sequence in a broadband wireless communication system includes a sequence generator for generating a sequence corresponding to sequence allocation information of the transmitting end among a plurality of candidate sequences; a signal string generator for generating a signal string corresponding to the sequence; and a transmitter for transmitting the signal string over a channel defined for transmission of the signal string. The sequence allocation information indicates a combination of at least one of a sequence length, a Zadoff-Chu sequence root index, orthogonal code indexes, and a cyclic shift offset. The plurality of the candidate sequences is obtained by extending a product of a covering code comprising a plurality of orthogonal codes and a Zadoff-Chu sequence through cyclic shift and multiplying a master covering sequence.

According to still another aspect of the present invention, an apparatus of a receiving end of an orthogonal sequence in a broadband wireless communication system includes a sequence generator for generating a sequence corresponding to sequence allocation information of a transmitting end among a plurality of candidate sequences; and a correlation operator for correlating a signal string received over a channel defined for transmission of the sequence with the sequence. The sequence allocation information indicates a combination of at least one of a sequence length, a Zadoff-Chu sequence root index, orthogonal code indexes, and a cyclic shift offset. The candidate sequences are obtained by extending a product of a covering code comprising a plurality of orthogonal codes and a Zadoff-Chu sequence through cyclic shift and multiplying a master covering sequence.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

Figure 1:
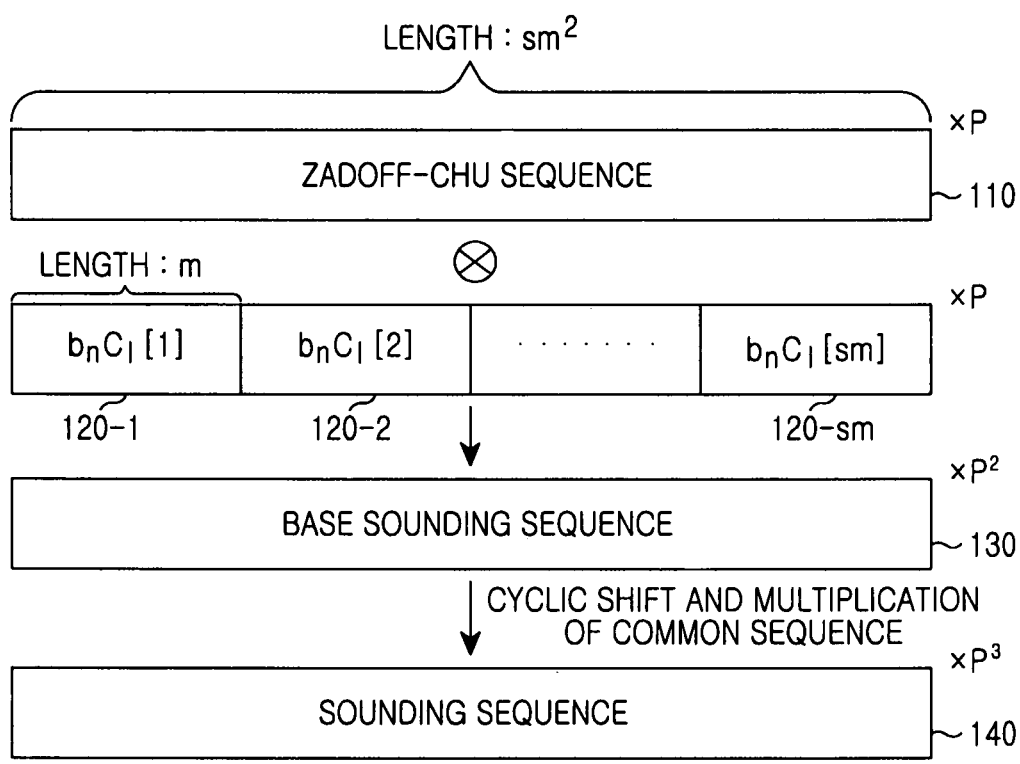
FIG. 1 illustrates the generation of sounding sequences in a broadband wireless communication system according to an exemplary embodiment of the present invention.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

Exemplary embodiments of the present invention provide a technique for increasing orthogonality between sounding signals and reference signals in a broadband wireless communication system. Hereinafter, Orthogonal Frequency Division Multiplexing (OFDM)/Orthogonal Frequency Division Multiple Access (OFDMA) wireless communication system is illustrated by way of example. Note that the present invention is applicable to other various wireless communication systems.

To ease the understanding, a sequence for the sounding signal is explained as an example. Yet, the sounding signal and the reference signal can be regarded equally in that they are used to estimate a channel at a receiving end and the orthogonality of the signal is used as their major performance index. Naturally, the following sequence generation can be equally applied to a sequence for the reference signal.

The present invention employs sounding signals generated based on a Zadoff-Chu sequence. Provided that the length of the sounding sequence is P, the Zadoff-Chu sequences on which the sequence is based, are generated according to Equation 1 or Equation 2. Equation 1 is applied to a case where the sequence length P is an even number and Equation 2 is applied to a case where the sequence length P is an odd number.

$$a_r[n]=e^{-j\pi r n^2/P}, n=0,1 \ldots P-1, \text{when } P \text{ is even} \quad [\text{Eqn. 1}]$$

In Equation 1, $a_r[n]$ denotes the n-th element of the Zadoff-Chu sequence, n denotes a tone index, r denotes a root index of the Zadoff-Chu sequence, and P denotes the length of the Zadoff-Chu sequence. Herein, n and r are integers greater than '0' and less than P−1.

$$a_r[n]=e^{-j\pi r n(n+1)/P}, n=0,1 \ldots P-1, \text{when } P \text{ is odd} \quad [\text{Eqn. 2}]$$

In Equation 2, $a_r[n]$ denotes the n-th element of the Zadoff-Chu sequence, n denotes a tone index, r denotes a root index of the Zadoff-Chu sequence, and P denotes the length of the Zadoff-Chu sequence. Herein, n and r are integers greater than 0 and less than P−1.

According to Equation 1 or Equation 2, r-ary in total; that is, P-ary Zadoff-Chu sequences are generated. Based on the P-ary Zadoff-Chu sequences, the present invention utilizes P-ary covering codes to generate the sounding sequences. To generate the covering codes, P is expressed to the product of two constant values; that is, the product of the first constant s and the square of the second constant m, namely, $sm^2$. In this exemplary embodiment, the covering code is represented as the product of two orthogonal codes. For example, the orthogonal code can employ a Discrete Fourier Transform (DFT) code. Given two orthogonal codes b and c, the covering codes are generated according to Equation 3:

$$v_{u,l}[n] = b_u[n \bmod m] c_l[\lceil n/m \rceil] \quad [\text{Eqn. 3}]$$
$$= e^{-j2\pi u(n \bmod m)/m} e^{-j2\pi l \lceil n/m \rceil/sm},$$
$$u = 0, 1 \ldots m-1;$$
$$l = 0, 1 \ldots sm-1$$

In Equation 3, $v_{u,l}[n]$ is the n-th element of the covering code with the index 'u,l', u is the index of the first orthogonal code, l is the index of the second orthogonal code, n is the tone index, $b_u$ is the first orthogonal code of the index u, m is the second constant constituting P, $c_l$ is the second orthogonal code of the index l, $\lceil \cdot \rceil$ is a round-up operator, and s is the first constant constituting P. Herein, u is an integer greater than 0 and less than m−1, and l is an integer greater than 0 and less than sm−1.

According to Equation 3, u×l-ary; that is, P-ary covering codes are generated. In Equation 3, the first orthogonal code is to enhance the correlation characteristic between the sounding sequences; that is, to lower the correlation value, and the second orthogonal code is to generate even more sequences while holding the correlation characteristic similar to the correlation characteristic of the sequence formed merely with the first orthogonal code. After generating the P-ary covering codes, the present invention generates $P^2$-ary base sounding sequences by multiplying the P-ary Zadoff-Chu sequences by the P-ary covering codes respectively. The Zadoff-Chu sequence and the covering code are multiplied according to Equation 4:

$$g_{r,u,l}[n]=a_r[n]v_{u,l}[n], n=0,1 \ldots P-1 \quad [\text{Eqn. 4}]$$

In Equation 4, $g_{r,u,l}[n]$ denotes the n-th element of the base sounding sequence with the index r,u,l, $a_r[n]$ did denotes the n-th element of the Zadoff-Chu sequence with the root index r, and $v_{u,l}[n]$ denotes the n-th element of the covering sequence with the index 'u,l'. Herein, n is an integer greater than 0 and less than P−1.

According to Equation 4, the $P^2$-ary base sounding sequences are generated. The present invention generates P-ary sounding sequences per base sounding sequence by using a cyclic shift. The sounding sequence is generated according to Equation 5:

$$C_{q,r,u,l}[k]=g_{r,u,l}[(k+q) \bmod P] f[k], k=0,1 \ldots N_{used}-1 \quad [\text{Eqn. 5}]$$

In Equation 5, $C_{q,r,u,l}[k]$ denotes the k-th element of the sounding sequence with the index q,r,u,l, q denotes a cyclic shift offset, $g_{r,u,l}$ denotes the base sounding sequence with the index r,u,l, k denotes the tone index, P denotes the length of the sounding sequence, f[k] denotes the k-th element of a master covering sequence, and $N_{used}$ denotes the number of usable tones for sending the sounding sequence. Herein, q is an integer greater than 0 and less than P−1. f[k] is an factor for decreasing a Peak to Average Power Ratio (PAPR) of the sounding sequence and is applied commonly to every sequence regardless of the index q,u,l. For example, f[k] can employ one of Golay sequence, random sequence, All-one sequence, and a sequence given by Equation 6:

$$f[k] = e^{-\frac{j\pi y((k+d) \bmod N_G)((k+d+1) \bmod N_G)}{N_G}} \quad [\text{Eqn. 6}]$$

In Equation 6, f[k] denotes the k-th element of the master covering sequence, k denotes the tone index, $N_G$ denotes a minimum prime number among the positive integers greater than the total number of the tones, y denotes a value selected to minimize the PAPR of the sounding sequence among the positive integers between 1 and $N_G-1$, and d denotes the index of the master covering sequence for increasing the number of the sounding sequences.

In Equation 6, $N_G$ and y are set to the same value in every base station. For example, when the number of the tones is 864, $N_G$ is 877. When the number of the sounding sequences is deficient, d is used to increase the number of the sounding sequences by using the different d values per base station. For example, a macro base station uses d as zero and a femto base station or a relay station uses d as a particular value, thus preventing the performance degradation of the sounding. For example, the particular value is randomly selected by the femto base station or the relay station, or can be derived from a corresponding cell IDentifier (ID).

According to Equation 5, $P^3$-ary sounding sequences are generated. The sounding sequences generated from the same base sounding sequences are referred to as a sounding sequence set.

As stated above, the sounding sequences are generated according to Equation 1 through Equation 5. The generation of the sounding sequences is conceptually depicted in FIG. 1. Referring to FIG. 1, P-ary Zadoff-Chu sequences 110 are multiplied by the covering codes 120-1 through 120-sm respectively. In so doing, P-ary covering code sets are used. In result, $P^2$-ary base sounding sequences are produced 130. Through the cyclic shift and the multiplication with the master covering sequence, P-ary sounding sequences are generated from each of the base sounding sequences 130; that is, $P^3$-ary sounding sequences are produced. According to the intention of the performer of the present invention, the number of the Zadoff-Chu sequences can be limited. For instance, when only one Zadoff-Chu sequence is used, $P^2$-ary sounding sequences are produced.

The sounding sequences generated as above have the correlation characteristic as expressed in Equation 7:

$$\langle C_{q_1,r_1,u_1,l_1}, C_{q_2,r_2,u_2,l_2} \rangle = \quad [\text{Eqn. 7}]$$
$$\begin{cases} 0 & q_1 \neq q_2, r_1 = r_2, u_1 = u_2, l_1 = l_2 \\ 0 & |q_1 - q_2| \neq \lambda sm(\lambda = 1, 2 \ldots m-1), r_1 = r_2, u_1 \neq u_2, l_1 = l_2 \end{cases}$$

In Equation 7, $C_{q,r,u,l}[k]$ denotes the sounding sequence with the index q, r, u, l, q denotes the cyclic shift offset, r denotes the root index of the Zadoff-Chu sequence, u denotes the first orthogonal code index of the covering code, l denotes the second orthogonal code index of the covering code, s denotes the first constant constituting P, m denotes the second constant constituting P, and $\lambda$, denotes an integer greater than 1 and less than m−1.

That is, the sounding sequences generated from the same base sounding sequence are orthogonal. In addition, the sounding sequences generated from the different base sounding sequences exhibit the peak of the cross correlation value only when a condition of Equation 8 is satisfied.

$$|q_1 - q_2| = \lambda sm(\lambda = 1, 2 \ldots m-1) \quad [\text{Eqn. 8}]$$

In Equation 8, q denotes the cyclic shift offset, s denotes the first constant constituting P, m denotes the second constant constituting P, and $\lambda$ denotes the integer greater than 1 and less than m−1.

Figure 2:
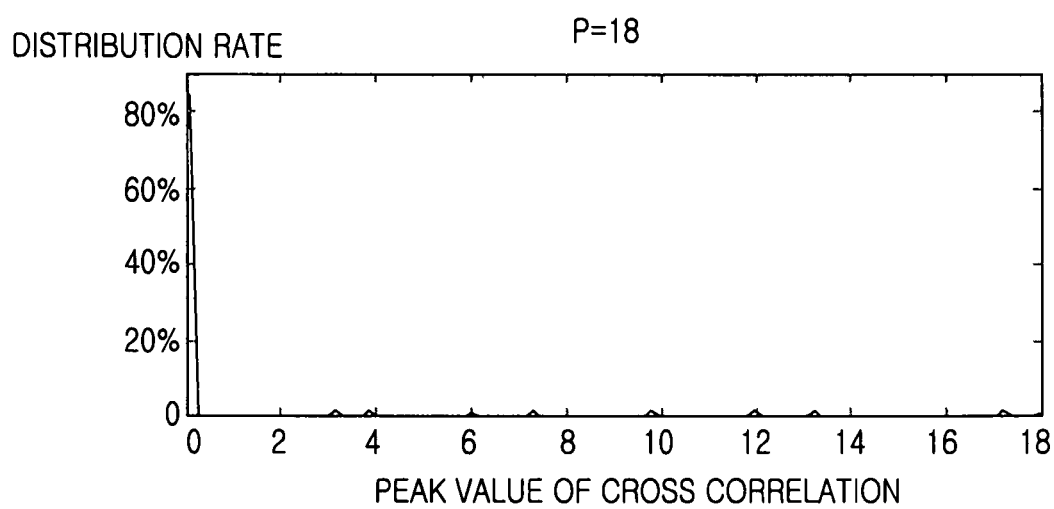
FIG. 2 illustrates the distribution of cross correlation peak values between the sounding sequences in the broadband wireless communication system according to an exemplary embodiment of the present invention.

For instance, when P is 18, the distribution of the cross correlation peak values between the sounding sequences is shown in FIG. 2. In FIG. 2, the horizontal axis indicates the peak value of the cross correlation of two random sounding sequences, and the vertical axis indicates the distribution rate. As shown in FIG. 2, the sounding sequence pairs with the peak value '0' of the cross correlation occupy 80% of the rate, and the sounding sequence pairs of which the peak value of the cross correlation is about 3, 4, 6, 7, 10, 12, 13, and 17 occupy relatively less rate. Namely, most sounding sequence pairs are orthogonal.

The sounding sequences generated as mentioned above are transmitted by the terminal as the sounding signal. More specifically, the base station allocates the index of the sounding sequence to the terminal, and the terminal transmits the sounding sequence corresponding to the allocated index. For doing so, the terminal needs to generate the sounding sequences corresponding to the assigned index. The terminal identifies the sounding sequence corresponding to the index by referring to a table which arranges the mapping relation between the pre-generated index and the sounding sequence, or directly generates the sounding sequence by substituting the assigned index into Equation 1 through Equation 5.

The sequences generated as above are transmitted by the base station as the reference signals. A plurality of base stations is assigned different indexes and each base station generates and transmits the reference signals using the sequence corresponding to its assigned index. Hence, the terminals estimate the channel using the reference signals based on the sequence corresponding to the index assigned to the serving base station, without influence of Inter Cell Interference (ICI). At this time, the terminals and the base stations identify the reference signal sequence corresponding to the index by referring to a table which arranges the mapping relation between the pre-generated index and the sequence, or directly generate the reference signal sequence by substituting the assigned index into Equation 1 through Equation 5.

The sequences can be defined as poly-phase sequences in the length P. As described earlier, each sequence is the combination of the base sequence and the cyclic shift version. When the length of the sequence is P, P-ary base sequence exist. In a multi-cell environment, the base sequences are allocated to the cells respectively and the reuse pattern of the initial sequence is determined by the intention of the performer of the invention. The allocation of the base sequence in one cell is controlled by a base station of the corresponding cell. P-ary cyclic shift versions are applied to one P-length base sequence to thus produce P-ary sequences. The P-ary sequences are allocated to the terminals.

An example of the base sequence of the length 4 is shown in Table 1.

TABLE 1

| Sequence index | k = 0 | k = 1 | k = 2 | k = 3 |
|---|---|---|---|---|
| 0 | 0.0000 | 0.2500 | 1.0000 | 0.2500 |
| 1 | 0.0000 | 1.2500 | 0.0000 | 0.2500 |
| 2 | 0.0000 | 1.2500 | 1.0000 | 1.2500 |
| 3 | 0.0000 | 0.2500 | 0.0000 | 1.2500 |

An example of the base sequence of the length 6 is shown in Table 2.

TABLE 2

| Sequence index | k = 0 | k = 1 | k = 2 | k = 3 | k = 4 | k = 5 |
|---|---|---|---|---|---|---|
| 0 | 0.0000 | 0.5000 | 1.3333 | 0.5000 | 0.0000 | 1.8333 |
| 1 | 0.0000 | 0.8333 | 0.0000 | 1.5000 | 1.3333 | 1.5000 |
| 2 | 0.0000 | 1.1667 | 0.6667 | 0.5000 | 0.6667 | 1.1667 |
| 3 | 0.0000 | 1.5000 | 1.3333 | 1.5000 | 0.0000 | 0.8333 |
| 4 | 0.0000 | 1.8333 | 0.0000 | 0.5000 | 1.3333 | 0.5000 |
| 5 | 0.0000 | 0.1667 | 0.6667 | 1.5000 | 0.6667 | 0.1667 |

An example of the base sequence of the length 8 is shown in Table 3.

TABLE 3

| Sequence index | k = 0 | k = 1 | k = 2 | k = 3 | k = 4 | k = 5 | k = 6 | k = 7 |
|---|---|---|---|---|---|---|---|---|
| 0 | 0.0000 | 0.1250 | 0.5000 | 1.1250 | 0.0000 | 1.1250 | 0.5000 | 0.1250 |
| 1 | 0.0000 | 0.6250 | 1.0000 | 0.1250 | 1.0000 | 0.6250 | 0.0000 | 0.1250 |
| 2 | 0.0000 | 1.1250 | 1.5000 | 1.1250 | 0.0000 | 0.1250 | 1.5000 | 0.1250 |
| 3 | 0.0000 | 1.6250 | 0.0000 | 0.1250 | 1.0000 | 1.6250 | 1.0000 | 0.1250 |
| 4 | 0.0000 | 1.1250 | 0.5000 | 0.1250 | 0.0000 | 0.1250 | 0.5000 | 1.1250 |
| 5 | 0.0000 | 1.6250 | 1.0000 | 1.1250 | 1.0000 | 1.6250 | 0.0000 | 1.1250 |

TABLE 3-continued

| Sequence index | k = 0 | k = 1 | k = 2 | k = 3 | k = 4 | k = 5 | k = 6 | k = 7 |
|---|---|---|---|---|---|---|---|---|
| 6 | 0.0000 | 0.1250 | 1.5000 | 0.1250 | 0.0000 | 1.1250 | 1.5000 | 1.1250 |
| 7 | 0.0000 | 0.6250 | 0.0000 | 1.1250 | 1.0000 | 0.6250 | 1.0000 | 1.1250 |

An example of the base sequence of the length 16 is shown in Table 4.

TABLE 4

| Sequence index | k = 0 | k = 1 | k = 2 | k = 3 | k = 4 | k = 5 | k = 6 | k = 7 |
|---|---|---|---|---|---|---|---|---|
| 0 | 0.0000 | 0.0625 | 0.2500 | 0.5625 | 1.0000 | 1.5625 | 0.2500 | 1.0625 |
| 1 | 0.0000 | 0.3125 | 0.5000 | 1.0625 | 1.5000 | 0.3125 | 1.0000 | 0.0625 |
| 2 | 0.0000 | 0.5625 | 0.7500 | 1.5625 | 0.0000 | 1.0625 | 1.7500 | 1.0625 |
| 3 | 0.0000 | 0.8125 | 1.0000 | 0.0625 | 0.5000 | 1.8125 | 0.5000 | 0.0625 |
| 4 | 0.0000 | 1.0625 | 1.2500 | 0.5625 | 1.0000 | 0.5625 | 1.2500 | 1.0625 |
| 5 | 0.0000 | 1.3125 | 1.5000 | 1.0625 | 1.5000 | 1.3125 | 0.0000 | 0.0625 |
| 6 | 0.0000 | 1.5625 | 1.7500 | 1.5625 | 0.0000 | 0.0625 | 0.7500 | 1.0625 |
| 7 | 0.0000 | 1.8125 | 0.0000 | 0.0625 | 0.5000 | 0.8125 | 1.5000 | 0.0625 |
| 8 | 0.0000 | 1.0625 | 0.2500 | 1.5625 | 1.0000 | 0.5625 | 0.2500 | 0.0625 |
| 9 | 0.0000 | 1.3125 | 0.5000 | 0.0625 | 1.5000 | 1.3125 | 1.0000 | 1.0625 |
| 10 | 0.0000 | 1.5625 | 0.7500 | 0.5625 | 0.0000 | 0.0625 | 1.7500 | 0.0625 |
| 11 | 0.0000 | 1.8125 | 1.0000 | 1.0625 | 0.5000 | 0.8125 | 0.5000 | 1.0625 |
| 12 | 0.0000 | 0.0625 | 1.2500 | 1.5625 | 1.0000 | 1.5625 | 1.2500 | 0.0625 |
| 13 | 0.0000 | 0.3125 | 1.5000 | 0.0625 | 1.5000 | 0.3125 | 0.0000 | 1.0625 |
| 14 | 0.0000 | 0.5625 | 1.7500 | 0.5625 | 0.0000 | 1.0625 | 0.7500 | 0.0625 |
| 15 | 0.0000 | 0.8125 | 0.0000 | 1.0625 | 0.5000 | 1.8125 | 1.5000 | 1.0625 |

| Sequence index | k = 8 | k = 9 | k = 10 | k = 11 | k = 12 | k = 13 | k = 14 | k = 15 |
|---|---|---|---|---|---|---|---|---|
| 0 | 0.0000 | 1.0625 | 0.2500 | 1.5625 | 1.0000 | 0.5625 | 0.2500 | 0.0625 |
| 1 | 1.0000 | 0.3125 | 1.5000 | 1.0625 | 0.5000 | 0.3125 | 0.0000 | 0.0625 |
| 2 | 0.0000 | 1.5625 | 0.7500 | 0.5625 | 0.0000 | 0.0625 | 1.7500 | 0.0625 |
| 3 | 1.0000 | 0.8125 | 0.0000 | 0.0625 | 1.5000 | 1.8125 | 1.5000 | 0.0625 |
| 4 | 0.0000 | 0.0625 | 1.2500 | 1.5625 | 1.0000 | 1.5625 | 1.2500 | 0.0625 |
| 5 | 1.0000 | 1.3125 | 0.5000 | 1.0625 | 0.5000 | 1.3125 | 1.0000 | 0.0625 |
| 6 | 0.0000 | 0.5625 | 1.7500 | 0.5625 | 0.0000 | 1.0625 | 0.7500 | 0.0625 |
| 7 | 1.0000 | 1.8125 | 1.0000 | 0.0625 | 1.5000 | 0.8125 | 0.5000 | 0.0625 |
| 8 | 0.0000 | 0.0625 | 0.2500 | 0.5625 | 1.0000 | 1.5625 | 0.2500 | 1.0625 |
| 9 | 1.0000 | 1.3125 | 1.5000 | 0.0625 | 0.5000 | 1.3125 | 0.0000 | 1.0625 |
| 10 | 0.0000 | 0.5625 | 0.7500 | 1.5625 | 0.0000 | 1.0625 | 1.7500 | 1.0625 |
| 11 | 1.0000 | 1.8125 | 0.0000 | 1.0625 | 1.5000 | 0.8125 | 1.5000 | 1.0625 |
| 12 | 0.0000 | 1.0625 | 1.2500 | 0.5625 | 1.0000 | 0.5625 | 1.2500 | 1.0625 |
| 13 | 1.0000 | 0.3125 | 0.5000 | 0.0625 | 0.5000 | 0.3125 | 1.0000 | 1.0625 |
| 14 | 0.0000 | 1.5625 | 1.7500 | 1.5625 | 0.0000 | 0.0625 | 0.7500 | 1.0625 |
| 15 | 1.0000 | 0.8125 | 1.0000 | 1.0625 | 1.5000 | 1.8125 | 0.5000 | 1.0625 |

An example of the base sequence of the length 9 is shown in Table 5.

TABLE 5

| Sequence index | k = 0 | k = 1 | k = 2 | k = 3 | k = 4 | k = 5 | k = 6 | k = 7 | k = 8 |
|---|---|---|---|---|---|---|---|---|---|
| 0 | 0.0000 | 0.2222 | 0.6667 | 1.3333 | 0.2222 | 1.3333 | 0.6667 | 0.2222 | 0.0000 |
| 1 | 0.0000 | 0.8889 | 1.3333 | 0.0000 | 1.5556 | 0.6667 | 0.0000 | 0.2222 | 0.0000 |
| 2 | 0.0000 | 1.5556 | 0.0000 | 0.6667 | 0.8889 | 0.0000 | 1.3333 | 0.2222 | 0.0000 |
| 3 | 0.0000 | 0.8889 | 0.0000 | 1.3333 | 0.8889 | 0.6667 | 0.6667 | 0.8889 | 1.3333 |
| 4 | 0.0000 | 1.5556 | 0.6667 | 0.0000 | 0.2222 | 0.0000 | 0.0000 | 0.8889 | 1.3333 |
| 5 | 0.0000 | 0.2222 | 1.3333 | 0.6667 | 1.5556 | 1.3333 | 1.3333 | 0.8889 | 1.3333 |
| 6 | 0.0000 | 1.5556 | 1.3333 | 1.3333 | 1.5556 | 0.0000 | 0.6667 | 1.5556 | 0.6667 |
| 7 | 0.0000 | 0.2222 | 2.0000 | 0.0000 | 0.8889 | 1.3333 | 0.0000 | 1.5556 | 0.6667 |
| 8 | 0.0000 | 0.8889 | 0.6667 | 0.6667 | 0.2222 | 0.6667 | 1.3333 | 1.5556 | 0.6667 |

An example of the base sequence of the length 18 is shown in Table 6.

TABLE 6

| Sequence index | k = 0 | k = 1 | k = 2 | k = 3 | k = 4 | k = 5 | k = 6 | k = 7 | k = 8 |
|---|---|---|---|---|---|---|---|---|---|
| 0 | 0.0000 | 0.0556 | 0.2222 | 0.5000 | 0.8889 | 1.3889 | 0.0000 | 0.7222 | 1.5556 |
| 1 | 0.0000 | 0.3889 | 0.5556 | 0.8333 | 1.5556 | 0.0556 | 0.6667 | 1.7222 | 0.5556 |
| 2 | 0.0000 | 0.7222 | 0.8889 | 1.1667 | 0.2222 | 0.7222 | 1.3333 | 0.7222 | 1.5556 |
| 3 | 0.0000 | 1.0556 | 1.2222 | 1.5000 | 0.8889 | 1.3889 | 0.0000 | 1.7222 | 0.5556 |
| 4 | 0.0000 | 1.3889 | 1.5556 | 1.8333 | 1.5556 | 0.0556 | 0.6667 | 0.7222 | 1.5556 |
| 5 | 0.0000 | 1.7222 | 1.8889 | 0.1667 | 0.2222 | 0.7222 | 1.3333 | 1.7222 | 0.5556 |
| 6 | 0.0000 | 0.7222 | 1.5556 | 0.5000 | 1.5556 | 0.7222 | 0.0000 | 1.3889 | 0.8889 |
| 7 | 0.0000 | 1.0556 | 1.8889 | 0.8333 | 0.2222 | 1.3889 | 0.6667 | 0.3889 | 1.8889 |
| 8 | 0.0000 | 1.3889 | 0.2222 | 1.6667 | 0.8889 | 0.0556 | 1.3333 | 1.3889 | 0.8889 |
| 9 | 0.0000 | 1.7222 | 0.5556 | 1.5000 | 1.5556 | 0.7222 | 0.0000 | 0.3889 | 1.8889 |
| 10 | 0.0000 | 0.0556 | 0.8889 | 1.8333 | 0.2222 | 1.3889 | 0.6667 | 1.3889 | 0.8889 |
| 11 | 0.0000 | 0.3889 | 1.2222 | 0.1667 | 0.8889 | 0.0556 | 1.3333 | 0.3889 | 1.8889 |
| 12 | 0.0000 | 1.3889 | 0.8889 | 0.5000 | 0.2222 | 0.0556 | 0.0000 | 0.0556 | 0.2222 |
| 13 | 0.0000 | 1.7222 | 1.2222 | 0.8333 | 0.8889 | 0.7222 | 0.6667 | 1.0556 | 1.2222 |
| 14 | 0.0000 | 0.0556 | 1.5556 | 1.1667 | 1.5556 | 1.3889 | 1.3333 | 0.0556 | 0.2222 |
| 15 | 0.0000 | 0.3889 | 1.8889 | 1.5000 | 0.2222 | 0.0556 | 0.0000 | 1.0556 | 1.2222 |
| 16 | 0.0000 | 0.7222 | 0.2222 | 1.8333 | 0.8889 | 0.7222 | 0.6667 | 0.0556 | 0.2222 |
| 17 | 0.0000 | 1.0556 | 0.5556 | 0.1667 | 1.5556 | 1.3889 | 1.3333 | 1.0556 | 1.2222 |

| Sequence index | k = 9 | k = 10 | k = 11 | k = 12 | k = 13 | k = 14 | k = 15 | k = 16 | k = 17 |
|---|---|---|---|---|---|---|---|---|---|
| 0 | 0.5000 | 1.5556 | 0.7222 | 0.0000 | 1.3889 | 0.8889 | 0.5000 | 0.2222 | 0.0556 |
| 1 | 1.5000 | 0.8889 | 0.0556 | 1.3333 | 1.0556 | 0.5556 | 0.1667 | 0.2222 | 0.0556 |
| 2 | 0.5000 | 0.2222 | 1.3889 | 0.6667 | 0.7222 | 0.2222 | 1.8333 | 0.2222 | 0.0556 |
| 3 | 1.5000 | 1.5556 | 0.7222 | 0.0000 | 0.3889 | 1.8889 | 1.5000 | 0.2222 | 0.0556 |
| 4 | 0.5000 | 0.8889 | 0.0556 | 1.3333 | 0.0556 | 1.5556 | 1.1667 | 0.2222 | 0.0556 |
| 5 | 1.5000 | 0.2222 | 1.3889 | 0.6667 | 1.7222 | 1.2222 | 0.8333 | 0.2222 | 0.0556 |
| 6 | 0.5000 | 0.2222 | 0.0556 | 0.0000 | 0.0556 | 0.2222 | 0.5000 | 0.8889 | 1.3889 |
| 7 | 1.5000 | 1.5556 | 1.3889 | 1.3333 | 1.7222 | 1.8889 | 0.1667 | 0.8889 | 1.3889 |
| 8 | 0.5000 | 0.8889 | 0.7222 | 0.6667 | 1.3889 | 1.5556 | 1.8333 | 0.8889 | 1.3889 |
| 9 | 1.5000 | 0.2222 | 0.0556 | 0.0000 | 1.0556 | 1.2222 | 1.5000 | 0.8889 | 1.3889 |
| 10 | 0.5000 | 1.5556 | 1.3889 | 1.3333 | 0.7222 | 0.8889 | 1.1667 | 0.8889 | 1.3889 |
| 11 | 1.5000 | 0.8889 | 0.7222 | 0.6667 | 0.3889 | 0.5556 | 0.8333 | 0.8889 | 1.3889 |
| 12 | 0.5000 | 0.8889 | 1.3889 | 0.0000 | 0.7222 | 1.5556 | 0.5000 | 1.5556 | 0.7222 |
| 13 | 1.5000 | 0.2222 | 0.7222 | 1.3333 | 0.3889 | 1.2222 | 0.1667 | 1.5556 | 0.7222 |
| 14 | 0.5000 | 1.5556 | 0.0556 | 0.6667 | 0.0556 | 0.8889 | 1.8333 | 1.5556 | 0.7222 |
| 15 | 1.5000 | 0.8889 | 1.3889 | 0.0000 | 1.7222 | 0.5556 | 1.5000 | 1.5556 | 0.7222 |
| 16 | 0.5000 | 0.2222 | 0.7222 | 1.3333 | 1.3889 | 0.2222 | 1.1667 | 1.5556 | 0.7222 |
| 17 | 1.5000 | 1.5556 | 0.0556 | 0.6667 | 1.0556 | 1.8889 | 0.8333 | 1.5556 | 0.7222 |

An example of the base sequence of the length 32 is shown in Table 7 through Table 10.

TABLE 7

| Sequence index | k = 0 | k = 1 | k = 2 | k = 3 | k = 4 | k = 5 | k = 6 | k = 7 |
|---|---|---|---|---|---|---|---|---|
| 0 | 0.0000 | 0.0313 | 0.1250 | 0.2813 | 0.5000 | 0.7813 | 1.1250 | 1.5313 |
| 1 | 0.0000 | 0.1563 | 0.2500 | 0.5313 | 0.7500 | 1.1563 | 1.5000 | 0.0313 |
| 2 | 0.0000 | 0.2813 | 0.3750 | 0.7813 | 1.0000 | 1.5313 | 1.8750 | 0.5313 |
| 3 | 0.0000 | 0.4063 | 0.5000 | 1.0313 | 1.2500 | 1.9063 | 0.2500 | 1.0313 |
| 4 | 0.0000 | 0.5313 | 0.6250 | 1.2813 | 1.5000 | 0.2813 | 0.6250 | 1.5313 |
| 5 | 0.0000 | 0.6563 | 0.7500 | 1.5313 | 1.7500 | 0.6563 | 1.0000 | 0.0313 |
| 6 | 0.0000 | 0.7813 | 0.8750 | 1.7813 | 0.0000 | 1.0313 | 1.3750 | 0.5313 |
| 7 | 0.0000 | 0.9063 | 1.0000 | 0.0313 | 0.2500 | 1.4063 | 1.7500 | 1.0313 |
| 8 | 0.0000 | 1.0313 | 1.1250 | 0.2813 | 0.5000 | 1.7813 | 0.1250 | 1.5313 |
| 9 | 0.0000 | 1.1563 | 1.2500 | 0.5313 | 0.7500 | 0.1563 | 0.5000 | 0.0313 |
| 10 | 0.0000 | 1.2813 | 1.3750 | 0.7813 | 1.0000 | 0.5313 | 0.8750 | 0.5313 |
| 11 | 0.0000 | 1.4063 | 1.5000 | 1.0313 | 1.2500 | 0.9063 | 1.2500 | 1.0313 |
| 12 | 0.0000 | 1.5313 | 1.6250 | 1.2813 | 1.5000 | 1.2813 | 1.6250 | 1.5313 |
| 13 | 0.0000 | 1.6563 | 1.7500 | 1.5313 | 1.7500 | 1.6563 | 0.0000 | 0.0313 |
| 14 | 0.0000 | 1.7813 | 1.8750 | 1.7813 | 0.0000 | 0.0313 | 0.3750 | 0.5313 |
| 15 | 0.0000 | 1.9063 | 0.0000 | 0.0313 | 0.2500 | 0.4063 | 0.7500 | 1.0313 |
| 16 | 0.0000 | 1.0313 | 0.1250 | 0.2813 | 0.5000 | 1.7813 | 1.1250 | 0.5313 |
| 17 | 0.0000 | 1.1563 | 0.2500 | 1.5313 | 0.7500 | 0.1563 | 1.5000 | 1.0313 |
| 18 | 0.0000 | 1.2813 | 0.3750 | 1.7813 | 1.0000 | 0.5313 | 1.8750 | 1.5313 |
| 19 | 0.0000 | 1.4063 | 0.5000 | 0.0313 | 1.2500 | 0.9063 | 0.2500 | 0.0313 |
| 20 | 0.0000 | 1.5313 | 0.6250 | 0.2813 | 1.5000 | 1.2813 | 0.6250 | 0.5313 |
| 21 | 0.0000 | 1.6563 | 0.7500 | 0.5313 | 1.7500 | 1.6563 | 1.0000 | 1.0313 |

TABLE 7-continued

| Sequence index | k = 0 | k = 1 | k = 2 | k = 3 | k = 4 | k = 5 | k = 6 | k = 7 |
|---|---|---|---|---|---|---|---|---|
| 22 | 0.0000 | 1.7813 | 0.8750 | 0.7813 | 0.0000 | 0.0313 | 1.3750 | 1.5313 |
| 23 | 0.0000 | 1.9063 | 1.0000 | 1.0313 | 0.2500 | 0.4063 | 1.7500 | 0.0313 |
| 24 | 0.0000 | 0.0313 | 1.1250 | 1.2813 | 0.5000 | 0.7813 | 0.1250 | 0.5313 |
| 25 | 0.0000 | 0.1563 | 1.2500 | 1.5813 | 0.7500 | 1.1563 | 0.5000 | 1.0313 |
| 26 | 0.0000 | 0.2813 | 1.3750 | 1.7813 | 1.0000 | 1.5313 | 0.8750 | 1.5313 |
| 27 | 0.0000 | 0.4063 | 1.5000 | 0.0313 | 1.2500 | 1.9063 | 1.2500 | 0.0313 |
| 28 | 0.0000 | 0.5313 | 1.6250 | 0.2813 | 1.5000 | 0.2813 | 1.6250 | 0.5313 |
| 29 | 0.0000 | 0.6563 | 1.7500 | 0.5313 | 1.7500 | 0.6563 | 0.0000 | 1.0313 |
| 30 | 0.0000 | 0.7813 | 1.8750 | 0.7813 | 0.0000 | 1.0313 | 0.3750 | 1.5313 |
| 31 | 0.0000 | 0.9063 | 0.0000 | 1.0313 | 0.2500 | 1.4063 | 0.7500 | 0.0313 |

TABLE 8

| Sequence Index | k = 8 | k = 9 | k = 10 | k = 11 | k = 12 | k = 13 | k = 14 | k = 15 |
|---|---|---|---|---|---|---|---|---|
| 0 | 0.0000 | 0.5313 | 1.1250 | 1.7813 | 0.5000 | 1.2813 | 0.1250 | 1.0313 |
| 1 | 0.5000 | 1.1563 | 1.7500 | 0.5313 | 1.2500 | 0.1563 | 1.0000 | 0.0313 |
| 2 | 1.0000 | 1.7813 | 0.3750 | 1.2813 | 0.0000 | 1.0313 | 1.8750 | 1.0313 |
| 3 | 1.5000 | 0.4063 | 1.0000 | 0.0313 | 0.7500 | 1.9063 | 0.7500 | 0.0313 |
| 4 | 0.0000 | 1.0313 | 1.6250 | 0.7813 | 1.5000 | 0.7813 | 1.6250 | 1.0313 |
| 5 | 0.5000 | 1.6563 | 0.2500 | 1.5313 | 1.2500 | 1.6563 | 0.5000 | 0.0313 |
| 6 | 1.0000 | 0.2813 | 0.8750 | 0.2813 | 1.0000 | 0.5313 | 1.3750 | 1.0313 |
| 7 | 1.5000 | 0.9063 | 1.5000 | 1.0313 | 1.7500 | 1.4063 | 0.2500 | 0.0313 |
| 8 | 0.0000 | 1.5313 | 0.1250 | 1.7813 | 0.5000 | 0.2813 | 1.1250 | 1.0313 |
| 9 | 0.5000 | 0.1563 | 0.7500 | 0.5313 | 1.2500 | 1.1563 | 0.0000 | 0.0313 |
| 10 | 1.0000 | 0.7813 | 1.3750 | 1.2813 | 0.0000 | 0.0313 | 0.8750 | 1.0313 |
| 11 | 1.5000 | 1.4063 | 0.0000 | 0.0313 | 0.7500 | 0.9063 | 1.7500 | 0.0313 |
| 12 | 0.0000 | 0.0313 | 0.6250 | 0.7813 | 1.5000 | 1.7813 | 0.6250 | 1.0313 |
| 13 | 0.5000 | 0.6563 | 1.2500 | 1.5313 | 0.2500 | 0.6563 | 1.5000 | 0.0313 |
| 14 | 1.0000 | 1.2813 | 1.8750 | 0.2813 | 1.0000 | 1.5313 | 0.3750 | 1.0313 |
| 15 | 1.5000 | 1.9063 | 0.5000 | 1.0313 | 1.7500 | 0.4063 | 1.2500 | 0.0313 |
| 16 | 0.0000 | 1.5313 | 1.1250 | 0.7813 | 0.5000 | 0.2813 | 0.1250 | 0.0313 |
| 17 | 0.5000 | 0.1563 | 1.7500 | 1.5313 | 1.2500 | 1.1563 | 1.0000 | 1.0313 |
| 18 | 1.0000 | 0.7813 | 0.3750 | 0.2813 | 0.0000 | 0.0313 | 1.8750 | 0.0313 |
| 19 | 1.5000 | 1.4063 | 1.0000 | 1.0313 | 0.7500 | 0.9063 | 0.7500 | 1.0313 |
| 20 | 0.0000 | 0.0313 | 1.6250 | 1.7813 | 1.5000 | 1.7813 | 1.6250 | 0.0313 |
| 21 | 0.5000 | 0.6563 | 0.2500 | 0.5313 | 0.2500 | 0.6563 | 0.5000 | 1.0313 |
| 22 | 1.0000 | 1.2813 | 0.8750 | 1.2813 | 1.0000 | 1.5313 | 1.3750 | 0.0313 |
| 23 | 1.5000 | 1.9063 | 1.5000 | 0.0313 | 1.7500 | 0.4063 | 0.2500 | 1.0313 |
| 24 | 0.0000 | 0.5313 | 0.1250 | 0.7813 | 0.5000 | 1.2813 | 1.1250 | 0.0313 |
| 25 | 0.5000 | 1.1563 | 0.7500 | 1.5313 | 1.2500 | 0.1563 | 0.0000 | 1.0313 |
| 26 | 1.0000 | 1.7813 | 1.3750 | 0.2813 | 0.0000 | 1.0313 | 0.8750 | 0.0313 |
| 27 | 1.5000 | 0.4063 | 0.0000 | 1.0313 | 0.7500 | 1.9063 | 1.7500 | 1.0313 |
| 28 | 0.0000 | 1.0313 | 0.6250 | 1.7813 | 1.5000 | 0.7813 | 0.6250 | 0.0313 |
| 29 | 0.5000 | 1.6563 | 1.2500 | 0.5313 | 0.2500 | 1.6563 | 1.5000 | 1.0313 |
| 30 | 1.0000 | 0.2813 | 1.8750 | 1.2813 | 1.0000 | 0.5313 | 0.3750 | 0.0313 |
| 31 | 1.5000 | 0.9063 | 0.5000 | 0.0313 | 1.7500 | 1.4063 | 1.2500 | 1.0313 |

TABLE 9

| Sequence index | k = 16 | k = 17 | k = 18 | k = 19 | k = 20 | k = 21 | k = 22 | k = 23 |
|---|---|---|---|---|---|---|---|---|
| 0 | 0.0000 | 1.0313 | 0.1250 | 1.2813 | 0.5000 | 1.7813 | 1.1250 | 0.5313 |
| 1 | 1.0000 | 0.1563 | 1.2500 | 0.5313 | 1.7500 | 1.1563 | 0.5000 | 0.0313 |
| 2 | 0.0000 | 1.2813 | 0.3750 | 1.7813 | 1.0000 | 0.5313 | 1.8750 | 1.5313 |
| 3 | 1.0000 | 0.4063 | 1.5000 | 1.0313 | 0.2500 | 1.9063 | 1.2500 | 1.0313 |
| 4 | 0.0000 | 1.5313 | 0.6250 | 0.2813 | 1.5000 | 1.2813 | 0.6250 | 0.5313 |
| 5 | 1.0000 | 0.6563 | 1.7500 | 1.5313 | 0.7500 | 0.6563 | 0.0000 | 0.0313 |
| 6 | 0.0000 | 1.7813 | 0.8750 | 0.7813 | 0.0000 | 0.0313 | 1.3750 | 1.5313 |
| 7 | 1.0000 | 0.9063 | 0.0000 | 0.0313 | 1.2500 | 1.4063 | 0.7500 | 1.0313 |
| 8 | 0.0000 | 0.0313 | 1.1250 | 1.2813 | 0.5000 | 0.7813 | 0.1250 | 0.5313 |
| 9 | 1.0000 | 1.1563 | 0.2500 | 0.5313 | 1.7500 | 0.1563 | 1.5000 | 0.0313 |
| 10 | 0.0000 | 0.2813 | 1.3750 | 1.7813 | 1.0000 | 1.5313 | 0.8750 | 1.5313 |
| 11 | 1.0000 | 1.4063 | 0.5000 | 1.0313 | 0.2500 | 0.9063 | 0.2500 | 1.0313 |
| 12 | 0.0000 | 0.5313 | 1.6250 | 0.2813 | 1.5000 | 0.2813 | 1.6250 | 0.5313 |
| 13 | 1.0000 | 1.6563 | 0.7500 | 1.5313 | 0.7500 | 1.6563 | 1.0000 | 0.0313 |

TABLE 9-continued

| Sequence index | k = 16 | k = 17 | k = 18 | k = 19 | k = 20 | k = 21 | k = 22 | k = 23 |
|---|---|---|---|---|---|---|---|---|
| 14 | 0.0000 | 0.7813 | 1.8750 | 0.7813 | 0.0000 | 1.0313 | 0.3750 | 1.5313 |
| 15 | 1.0000 | 1.9063 | 1.0000 | 0.0313 | 1.2500 | 0.4063 | 1.7500 | 1.0313 |
| 16 | 0.0000 | 0.0313 | 0.1250 | 0.2813 | 0.5000 | 0.7813 | 1.1250 | 1.5313 |
| 17 | 1.0000 | 1.1563 | 1.2500 | 1.5313 | 1.7500 | 0.1563 | 0.5000 | 1.0313 |
| 18 | 0.0000 | 0.2813 | 0.3750 | 0.7813 | 1.0000 | 1.5313 | 1.8750 | 0.5313 |
| 19 | 1.0000 | 1.4063 | 1.5000 | 0.0313 | 0.2500 | 0.9063 | 1.2500 | 0.0313 |
| 20 | 0.0000 | 0.5313 | 0.6250 | 1.2813 | 1.5000 | 0.2813 | 0.6250 | 1.5313 |
| 21 | 1.0000 | 1.6563 | 1.7500 | 0.5313 | 0.7500 | 1.6563 | 0.0000 | 1.0313 |
| 22 | 0.0000 | 0.7813 | 0.8750 | 1.7813 | 0.0000 | 1.0313 | 1.3750 | 0.5313 |
| 23 | 1.0000 | 1.9063 | 0.0000 | 1.0313 | 1.2500 | 0.4063 | 0.7500 | 0.0313 |
| 24 | 0.0000 | 1.0313 | 1.1250 | 0.2813 | 0.5000 | 1.7813 | 0.1250 | 1.5313 |
| 25 | 1.0000 | 0.1563 | 0.2500 | 1.5313 | 1.7500 | 1.1563 | 1.5000 | 1.0313 |
| 26 | 0.0000 | 1.2813 | 1.3750 | 0.7813 | 1.0000 | 0.5313 | 0.8750 | 0.5313 |
| 27 | 1.0000 | 0.4063 | 0.5000 | 0.0313 | 0.2500 | 1.9063 | 0.2500 | 0.0313 |
| 28 | 0.0000 | 1.5313 | 1.6250 | 1.2813 | 1.5000 | 1.2813 | 1.6250 | 1.5313 |
| 29 | 1.0000 | 0.6563 | 0.7500 | 0.5313 | 0.7500 | 0.6563 | 1.0000 | 1.0313 |
| 30 | 0.0000 | 1.7813 | 1.8750 | 1.7813 | 0.0000 | 0.0313 | 0.3750 | 0.5313 |
| 31 | 1.0000 | 0.9063 | 1.0000 | 1.0313 | 1.2500 | 1.4063 | 1.7500 | 0.0313 |

TABLE 10

| Sequence index | k = 24 | k = 25 | k = 26 | k = 27 | k = 28 | k = 29 | k = 30 | k = 31 |
|---|---|---|---|---|---|---|---|---|
| 0 | 0.0000 | 1.5313 | 1.1250 | 0.7813 | 0.5000 | 0.2813 | 0.1250 | 0.0313 |
| 1 | 1.5000 | 1.1563 | 0.7500 | 0.5313 | 0.2500 | 0.1563 | 0.0000 | 0.0313 |
| 2 | 1.0000 | 0.7813 | 0.3750 | 0.2813 | 0.0000 | 0.0313 | 1.8750 | 0.0313 |
| 3 | 0.5000 | 0.4063 | 0.0000 | 0.0313 | 1.7500 | 1.9063 | 1.7500 | 0.0313 |
| 4 | 0.0000 | 0.0313 | 1.6250 | 1.7813 | 1.5000 | 1.7813 | 1.6200 | 0.0313 |
| 5 | 1.5000 | 1.6563 | 1.2500 | 1.5313 | 1.2500 | 1.6563 | 1.5000 | 0.0313 |
| 6 | 1.0000 | 1.2813 | 0.8750 | 1.2813 | 1.0000 | 1.5313 | 1.3750 | 0.0313 |
| 7 | 0.5000 | 0.9063 | 0.5000 | 1.0313 | 0.7500 | 1.4063 | 1.2500 | 0.0313 |
| 8 | 0.0000 | 0.5313 | 0.1250 | 0.7813 | 0.5000 | 1.2813 | 1.1250 | 0.0313 |
| 9 | 1.5000 | 0.1563 | 1.7500 | 0.5313 | 0.2500 | 1.1563 | 1.0000 | 0.0313 |
| 10 | 1.0000 | 1.7813 | 1.3750 | 0.2813 | 0.0000 | 1.0313 | 0.8750 | 0.0313 |
| 11 | 0.5000 | 1.4063 | 1.0000 | 0.0313 | 1.7500 | 0.9063 | 0.7500 | 0.0313 |
| 12 | 0.0000 | 1.0313 | 0.6250 | 1.7813 | 1.5000 | 0.7813 | 0.6250 | 0.0313 |
| 13 | 1.5000 | 0.6563 | 0.2500 | 1.5313 | 1.2500 | 0.6563 | 0.5000 | 0.0313 |
| 14 | 1.0000 | 0.2813 | 1.8750 | 1.2813 | 1.0000 | 0.5313 | 0.3750 | 0.0313 |
| 15 | 0.5000 | 1.9063 | 1.5000 | 1.0313 | 0.7500 | 0.4063 | 0.2500 | 0.0313 |
| 16 | 0.0000 | 0.5313 | 1.1250 | 1.7813 | 0.5000 | 1.2813 | 0.1250 | 1.0313 |
| 17 | 1.5000 | 0.1563 | 0.7500 | 1.5313 | 0.2500 | 1.1563 | 0.0000 | 1.0313 |
| 18 | 1.0000 | 1.7813 | 0.3750 | 1.2813 | 0.0000 | 1.0313 | 1.8750 | 1.0313 |
| 19 | 0.5000 | 1.4063 | 0.0000 | 1.0313 | 1.7500 | 0.9063 | 1.7500 | 1.0313 |
| 20 | 0.0000 | 1.0313 | 1.6250 | 0.7813 | 1.5000 | 0.7813 | 1.6200 | 1.0313 |
| 21 | 1.5000 | 0.6563 | 1.2500 | 0.5313 | 1.2500 | 0.6563 | 1.5000 | 1.0313 |
| 22 | 1.0000 | 0.2813 | 0.8750 | 0.2813 | 1.0000 | 0.5313 | 1.3750 | 1.0313 |
| 23 | 0.5000 | 1.9063 | 0.5000 | 0.0313 | 0.7500 | 0.4063 | 1.2500 | 1.0313 |
| 24 | 0.0000 | 1.5313 | 0.1250 | 1.7813 | 0.5000 | 0.2813 | 1.1250 | 1.0313 |
| 25 | 1.5000 | 1.1563 | 1.7500 | 1.5313 | 0.2500 | 0.1563 | 1.0000 | 1.0313 |
| 26 | 1.0000 | 0.7813 | 1.3750 | 1.2813 | 0.0000 | 0.0313 | 0.8750 | 1.0313 |
| 27 | 0.5000 | 0.4063 | 1.0000 | 1.0313 | 1.7500 | 1.9063 | 0.7500 | 1.0313 |
| 28 | 0.0000 | 0.0313 | 0.6250 | 0.7813 | 1.5000 | 1.7813 | 0.6250 | 1.0313 |
| 29 | 1.5000 | 1.6563 | 0.2500 | 0.5313 | 1.2500 | 1.6563 | 0.5000 | 1.0313 |
| 30 | 1.0000 | 1.2813 | 1.8750 | 0.2813 | 1.0000 | 1.5313 | 0.3750 | 1.0313 |
| 31 | 0.5000 | 0.9063 | 1.5000 | 0.0313 | 0.7500 | 1.4063 | 0.2500 | 1.0313 |

When the tone set of the size 18×6 is used as one resource bundle and L-ary tones are used in one resource bundle to send the sequence, the value of L can be 4, 6, 8, 16, 9, 18 or 32 to use the base sequences of Table 1 through Table 10.

In conformity to Code Division Multiplexing (CDM), $\lceil P/L \rceil$-ary consecutive resource bundles can be used to transmit the sequence. Alternatively, when L is greater than the sequence length P, the sequence can be repeatedly transmitted $\lfloor L/P \rfloor$ times in one resource bundle. In this case, transmitting ends of the sequence apply different cyclic shift offsets.

In conformity to Frequency Division Multiplexing (FDM), the transmitting ends use different tones. When R-ary tones of the L-ary tones in one resource bundle are used to transmit the sequence of one transmitting end, $\lfloor /P \rfloor$-ary transmitting ends can send the sequence through one resource bundle. That is, the transmitting ends are allocated the different cyclic shift offsets, and the sequence is transmitted through P-ary tones in the $\lceil P/R \rceil$-ary consecutive resource bundles.

The sequence generation technique as above can be applied to not only the sounding signal and the reference signal but also a ranging sequence for initial ranging. The initial ranging is carried out between the terminal initially accessing the base station and the base station and initiated by the terminal by sending the ranging signal. Since the terminal does not have any other information than synchronization information of the base station, it sends the ranging signal which is detectable using a physical method. The ranging sequence constituting the ranging signal can be generated in the same manner as the sounding sequence generation. Yet, unlike the sounding sequence generation, the length of the ranging sequence is fixed. Since the ranging signal is transmitted over a ranging channel and the terminal needs to send the ranging signal without any information, the location of the ranging channel and the number of the tones are fixed.

The base station needs to attempt to detect the ranging signal using every ranging sequence defined for the initial ranging. Provided that the length of the ranging sequence is N, $N^3$-ary sequences can be generated according to Equation 1 through Equation 5. However, when the $N^3$-ary sequences are defined as the ranging sequences for the initial ranging, computations of the base station are considerable. To reduce the computations of the base station, the system can define only some of the $N^3$-ary sequences as the ranging sequences for the initial ranging.

Now, operations and structures of the terminal and the base station for transmitting the signal of a particular purpose using the sequences generated as above are explained in detail by referring to the drawings.

Figure 3:
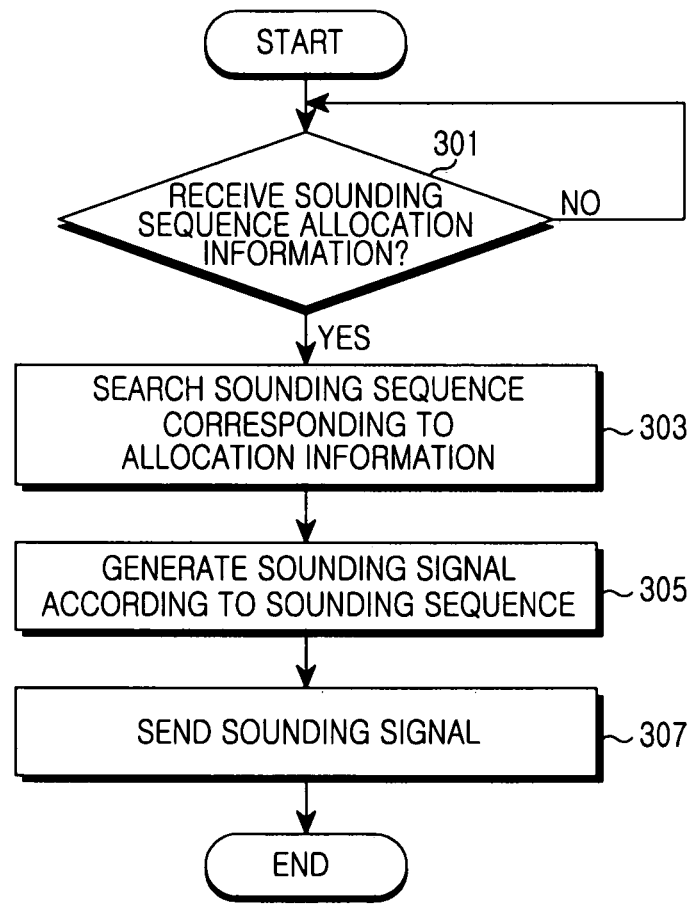
FIG. 3 illustrates a method for transmitting a sounding signal of a terminal in the broadband wireless communication system according to one exemplary embodiment of the present invention.

FIG. 3 illustrates a method for transmitting the sounding signal of the terminal in the broadband wireless communication system according to one exemplary embodiment of the present invention.

In step 301, the terminal checks whether sounding sequence allocation information is received. The sounding sequence allocation information includes the sounding sequence length, the root index of the Zadoff-Chu sequence, the orthogonal code indexes, the cyclic shift offset, and the master covering sequence index. When the system uses only one Zadoff-Chu sequence, the sounding sequence allocation information includes the sounding sequence length, the orthogonal code indexes, the cyclic shift offset, and the master covering sequence index. Alternatively, in another exemplary embodiment of the present invention, the sounding sequence allocation information includes at least one of the base sounding sequence index, the cyclic shift offset, and the master covering sequence index. In all of those cases, when the master covering sequence is allocated by the base station, the sounding sequence allocation information includes the master covering sequence index. By contrast, when the master covering sequence is determined by a pre-agreed rule, the sounding sequence allocation information does not include the master covering sequence index.

Upon receiving the sounding sequence allocation information, the terminal searches the sounding sequence corresponding to the allocation information in the pre-stored table in step 303. More specifically, the terminal stores the table which arranges the mapping relation between the combinations of at least two of the sounding sequence length, the root index of the Zadoff-Chu sequence, the orthogonal code indexes, and the cyclic shift offset, and the sounding sequences, and looks up its allocated sounding sequence in the table. Herein, the table includes the sounding sequences generated according to Equation 1 through Equation 5, which can be at least one of Table 1 through Table 10. When the sounding sequence is retrieved from the table such as Table 1 through Table 10, the sequence retrieved from the table is the sequence not applying the cyclic shift and the common covering code. Accordingly, the terminal cyclic-shifts the retrieved sequence according to the cyclic shift index of the sequence allocation information, multiples the shifted sequence by the common covering code, and thus produces the sounding sequence. In so doing, the terminal generates the common covering code according to the common covering code index, and the common covering code index is contained in the sequence allocation information or determined by the terminal based on the agreed rule. For example, the agreed rule can rely on the type of the wirelessly accessed node. That is, the common covering code index is zero when the terminal is connected to the macro base station, and is derived from the cell ID when the terminal is connected to the femto base station or the relay station.

In step 305, the terminal generates the sounding signal according to the retrieved sounding sequence. That is, the terminal generates a complex signal string corresponding to the P-ary elements constituting the sounding sequence.

In step 307, the terminal transmits the sounding signal over the sounding channel. More particularly, the terminal maps the complex signal string constituting the sounding signal to the sounding tones, converts the complex signals mapped to the sounding tones to a time-domain signal through Inverse Fast Fourier Transform (IFFT) operation, inserts a Cyclic Prefix (CP), and transmits the signal over an antenna. Herein, the sounding tones are positioned at preset locations, or positioned as allocated from the base station.

Figure 4:
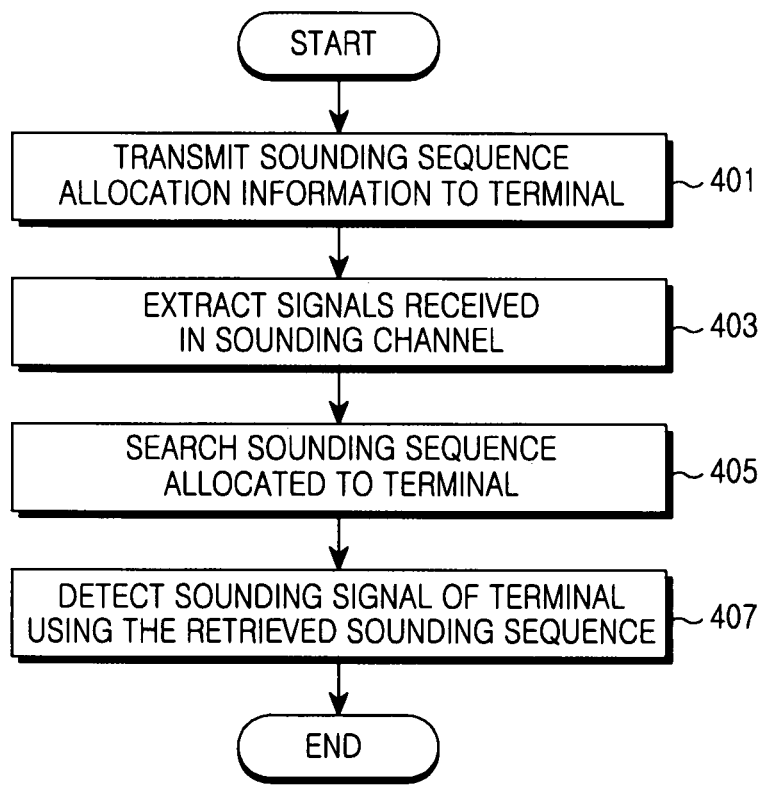
FIG. 4 illustrates a method for detecting the sounding signal of a base station in the broadband wireless communication system according to one exemplary embodiment of the present invention.

FIG. 4 illustrates a method for detecting the sounding signal of the base station in the broadband wireless communication system according to one exemplary embodiment of the present invention.

In step 401, the base station allocates the sounding sequence to the terminal and transmits the sounding sequence allocation information to the terminal. The sounding sequence allocation information includes the sounding sequence length, the root index of the Zadoff-Chu sequence, the orthogonal code indexes, the cyclic shift offset, and the master covering sequence index. When the system uses only one Zadoff-Chu sequence, the sounding sequence allocation information includes the sounding sequence length, the orthogonal code indexes, the cyclic shift offset, and the master covering sequence index. Alternatively, in another exemplary embodiment of the present invention, the sounding sequence allocation information includes at least one of the base sounding sequence index, the cyclic shift offset, and the master covering sequence index. When the master covering sequence is allocated by the base station, the sounding sequence allocation information includes the master covering sequence index. By contrast, when the master covering sequence is determined by the pre-agreed rule, the sounding sequence allocation information does not include the master covering sequence index.

In step 403, the base station extracts the signals received over the sounding channel. More specifically, the base station splits the signal received over an antenna on the OFDM symbols, removes the CP, restores the complex signals mapped to the tones through FFT operation, and extracts the signals mapped to the sounding tones. Herein, the sounding tones are positioned at preset locations, or at the locations allocated for the sounding signal delivery of the terminal.

In step 405, the base station searches the sounding sequence allocated to the terminal. The base station stores the table which arranges the mapping relation between the combinations of at least two of the sounding sequence length, the root index of the Zadoff-Chu sequence, the orthogonal code indexes, and the cyclic shift offset, and the sounding sequences, and looks up the sounding sequence corresponding to the allocation information transmitted to the terminal in the table. Herein, the table includes the sounding sequences generated according to Equation 1 through Equation 5, which can be at least one of Table 1 through Table 10.

When the sounding sequence is retrieved from the table such as Table 1 through Table 10, the sequence retrieved from the table is the sequence not applying the cyclic shift and the common covering code. Accordingly, the base station cyclic-shifts the retrieved sequence according to the cyclic shift index of the sequence allocation information, multiples the shifted sequence by the common covering code, and thus determines the sounding sequence allocated to the terminal. In so doing, the base station generates the common covering code according to the common covering code index, and the common covering code index is determined by the agreed rule. For example, the agreed rule can rely on the type of the base station. That is, the common covering code index is zero in case of the macro base station, and is derived from the cell ID in case of the femto base station.

In step 407, the base station detects the sounding signal of the terminal using the retrieved sounding sequence. Herein, the detection of the sounding signal implies the estimation of a channel coefficient for the terminal. More particularly, the base station multiples conjugate values of the signals extracted in step 403 by the retrieved sounding sequence. Namely, the base station performs the correlation operation between the extracted signals and the retrieved sounding sequence. Thus, the base station acquires the channel coefficient for the terminal.

Figure 5:
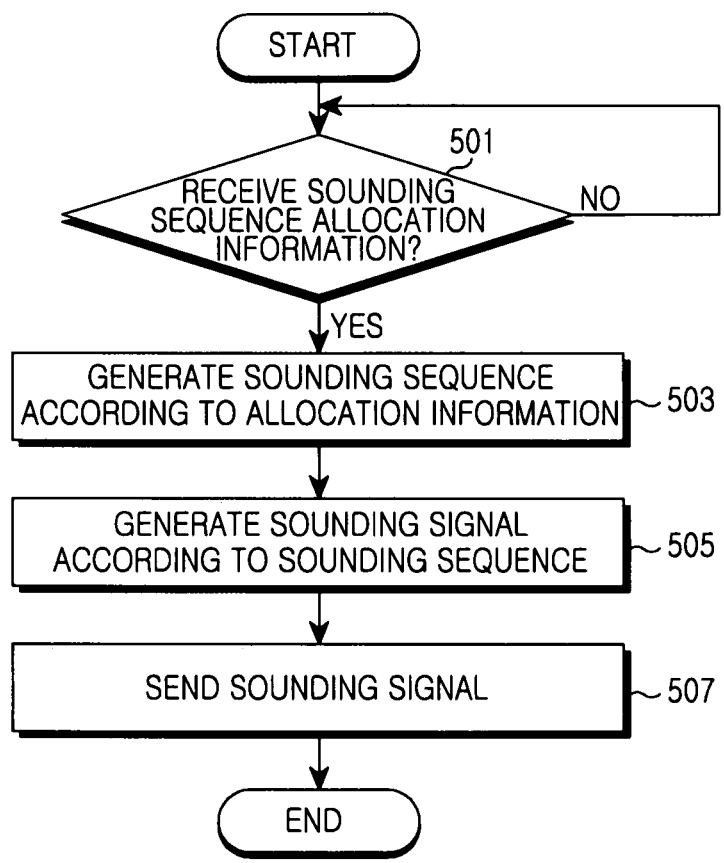
FIG. 5 illustrates a method for transmitting the sounding signal of the terminal in the broadband wireless communication system according to another exemplary embodiment of the present invention.

FIG. 5 illustrates a method for transmitting the sounding signal of the terminal in the broadband wireless communication system according to another exemplary embodiment of the present invention.

In step 501, the terminal checks whether the sounding sequence allocation information is received. The sounding sequence allocation information includes the sounding sequence length, the root index of the Zadoff-Chu sequence, the orthogonal code indexes, the cyclic shift offset, and the master covering sequence index. When the system uses only one Zadoff-Chu sequence, the sounding sequence allocation information includes the sounding sequence length, the orthogonal code indexes, the cyclic shift offset, and the master covering sequence. Alternatively, the sounding sequence allocation information includes at least one of the base sounding sequence index, the cyclic shift offset, and the master covering sequence index. When the master covering sequence is allocated by the base station, the sounding sequence allocation information includes the master covering sequence index. By contrast, when the master covering sequence is determined by the pre-agreed rule, the sounding sequence allocation information does not include the master covering sequence index.

Upon receiving the sounding sequence allocation information, the terminal generates the sounding sequence according to the allocation information in step 503. More specifically, the terminal generates its allocated sounding sequence by substituting the sounding sequence length, the root index of the Zadoff-Chu sequence, the orthogonal code indexes, and the cyclic shift offset of the allocation information into Equation 1 through Equation 5. In so doing, the first constant s and the second constant m corresponding to the sounding sequence length are predefined, and the terminal looks up the first constant s and the second constant m in the table of the mapping relation between the sounding sequence length and the constants. In other words, the terminal generates the P-length Zadoff-Chu sequence and generates the covering code consisting of the first orthogonal code of the index u and the second orthogonal code of the index l. The terminal generates the base sounding sequence by multiplying the Zadoff-Chu sequence by the covering code. Next, the terminal cyclic-shifts the base sounding sequence according to the cyclic shift offset of the allocation information and generates the sounding sequence by multiplying by the master covering sequence. In so doing, the terminal generates the common covering code according to the common covering code index, and the common covering code index is contained in the sequence allocation information or determined by the terminal based on the agreed rule. For example, the agreed rule can rely on the type of the wirelessly connected node. That is, the common covering code index is zero when the terminal is connected to the macro base station, and is derived from the cell ID when the terminal is connected to the femto base station or the relay station.

In step 505, the terminal generates the sounding signal according to the retrieved sounding sequence. That is, the terminal generates a complex signal string corresponding to the P-ary elements constituting the sounding sequence.

In step 507, the terminal transmits the sounding signal over the sounding channel. More particularly, the terminal maps the complex signal string constituting the sounding signal to the sounding tones, converts the complex signals mapped to the sounding tones to a time-domain signal through the IFFT operation, inserts the CP, and transmits the signal over the antenna. Herein, the sounding tones are positioned at preset locations, or positioned as allocated from the base station.

Figure 6:
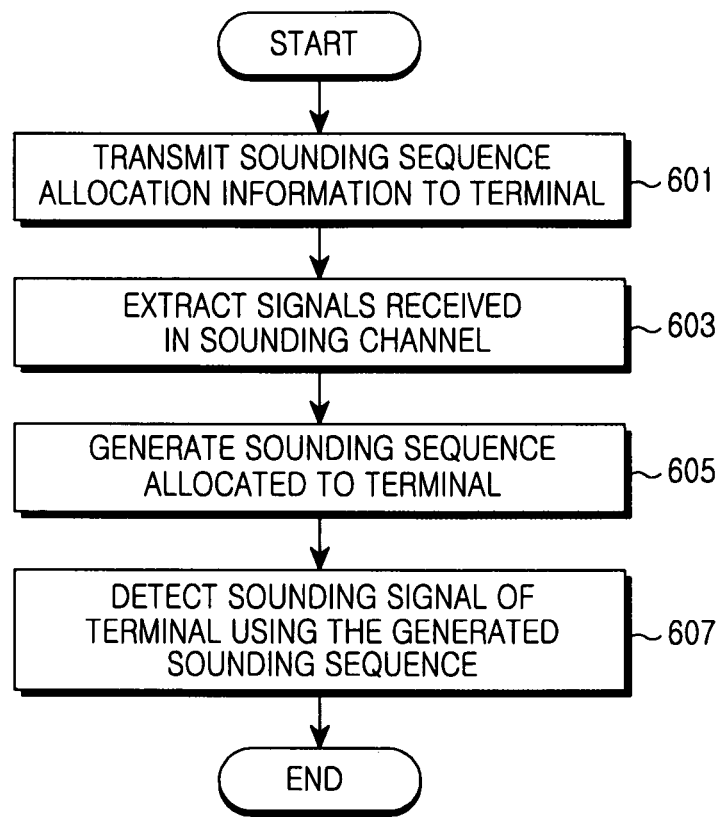
FIG. 6 illustrates a method for detecting the sounding signal of the base station in the broadband wireless communication system according to another exemplary embodiment of the present invention.

FIG. 6 illustrates a method for detecting the sounding signal of the base station in the broadband wireless communication system according to another exemplary embodiment of the present invention.

In step 601, the base station allocates the sounding sequence to the terminal and transmits the sounding sequence allocation information to the terminal. The sounding sequence allocation information includes the sounding sequence length, the root index of the Zadoff-Chu sequence, the orthogonal code indexes, the cyclic shift offset, and the common covering code index. When the system uses only one Zadoff-Chu sequence, the sounding sequence allocation information includes the sounding sequence length, the orthogonal code indexes, the cyclic shift offset, and the common covering code index. Alternatively, the sounding sequence allocation information includes at least one of the base sounding sequence index, the cyclic shift offset, and the master covering sequence index. When the master covering sequence is allocated by the base station, the sounding sequence allocation information includes the master covering sequence index. By contrast, when the master covering sequence is determined by the pre-agreed rule, the sounding sequence allocation information does not include the master covering sequence index.

In step 603, the base station extracts the signals received over the sounding channel. More specifically, the base station splits the signal received over the antenna to the OFDM symbols, removes the CP, restores the complex signals mapped to the tones through the FFT operation, and extracts the signals mapped to the sounding tones. Herein, the sounding tones are positioned at preset locations, or at the locations allocated for the sounding signal delivery of the terminal.

In step 605, the base station generates the sounding sequence allocated to the terminal. The base station generates the sounding sequence allocated to the terminal by substituting the sounding sequence length, the root index of the Zadoff-Chu sequence, the orthogonal code indexes, and the cyclic shift offset of the allocation information into Equation 1 through Equation 5. In so doing, the first constant s and the second constant m corresponding to the sounding sequence length are predefined, and the base station looks up the first constant s and the second constant m in the table of the mapping relation between the sounding sequence lengths and the constants. In other words, the base station generates the P-length Zadoff-Chu sequence and generates the covering code consisting of the first orthogonal code of the index u and the second orthogonal code of the index l. The base station generates the base sounding sequence by multiplying the Zadoff-Chu sequence by the covering code. Next, the base station cyclic-shifts the base sounding sequence according to the cyclic shift offset of the allocation information and generates the sounding sequence allocated to the terminal by multiplying the master covering sequence. In so doing, the base station generates the common covering code according to the common covering code index, and the common covering code index is determined by the agreed rule. For example, the agreed rule can rely on the type of the base station. That is, the common covering code index is zero in case of the macro base station, and is derived from the cell ID in case of the femto base station.

In step 607, the base station detects the sounding signal of the terminal using the generated sounding sequence. Herein, the detection of the sounding signal implies the estimation of the channel coefficient for the terminal. In more detail, the base station multiples conjugate values of the signals extracted in step 603 by the retrieved sounding sequence. Namely, the base station correlates the extracted signals with the retrieved sounding sequence. Thus, the base station acquires the channel coefficient for the terminal.

Figure 7:
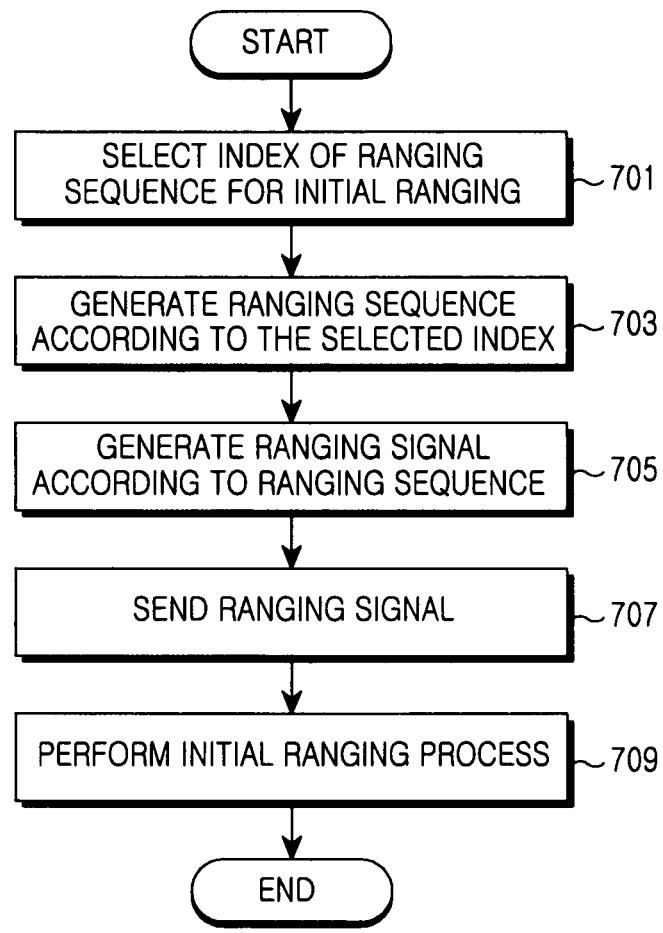
FIG. 7 illustrates a method for transmitting a ranging signal of the terminal in the broadband wireless communication system according to an exemplary embodiment of the present invention.

FIG. 7 illustrates a method for transmitting the ranging signal of the terminal in the broadband wireless communication system according to an exemplary embodiment of the present invention.

In step 701, the terminal selects an index combination of the ranging sequence for the initial ranging. Herein, the index combination of the ranging sequence includes the root index of the Zadoff-Chu sequence, the orthogonal code indexes, and the cyclic shift offset. When the system uses only one Zadoff-Chu sequence, the index of the ranging sequence includes the orthogonal code indexes and the cyclic shift offset.

In step 703, the terminal generates the ranging sequence according to the selected index combination. More specifically, the terminal generates the ranging sequence for the initial ranging by substituting the ranging sequence length, the root index of the Zadoff-Chu sequence, and the cyclic shift offset into Equation 1 through Equation 5. In other words, the terminal generates the Zadoff-Chu sequence of the length N and generates the covering code constituting of the first orthogonal code of the index u and the second orthogonal code of the index l. Next, the terminal generates the base ranging sequence by multiplying the Zadoff-Chu sequence and the covering code. After cyclic-shifting the base ranging sequence according to the selected cyclic shift offset, the terminal generates the ranging sequence by multiplying the master covering sequence.

In step 705, the terminal generates the ranging signal according to the generated ranging sequence. That is, the terminal generates the complex signal string corresponding to the P-ary elements constituting the ranging sequence.

In step 707, the terminal sends the ranging signal over a ranging channel. In more detail, the terminal maps the complex signal string constituting the ranging signal to the ranging tones, converts the complex signals mapped to the sounding tones to a time-domain signal through the IFFT operation, inserts the CP, and sends the signal over the antenna.

In step 709, the terminal performs the initial ranging process. After sending the ranging signal, the terminal is allocated the resource for the initial ranging process from the base station and conducts the initial ranging process by signaling using the allocated resource.

In FIG. 7, the terminal directly generates the ranging sequence to produce the ranging signal. In other exemplary embodiment, the terminal can use a pre-stored table. In this case, the terminal looks up the ranging sequence corresponding to the selected index in the pre-stored table in step 703. That is, the terminal stores the table which arranges the mapping relation between the combinations of at least two of the root index of the Zadoff-Chu sequence, the orthogonal code indexes, and the cyclic shift offset, and the ranging sequences, and looks up the ranging sequence corresponding to the selected index in the table. Herein, the table includes the ranging sequences generated according to Equation 1 through Equation 5, which can be at least one of Table 1 through Table 10.

Figure 8:
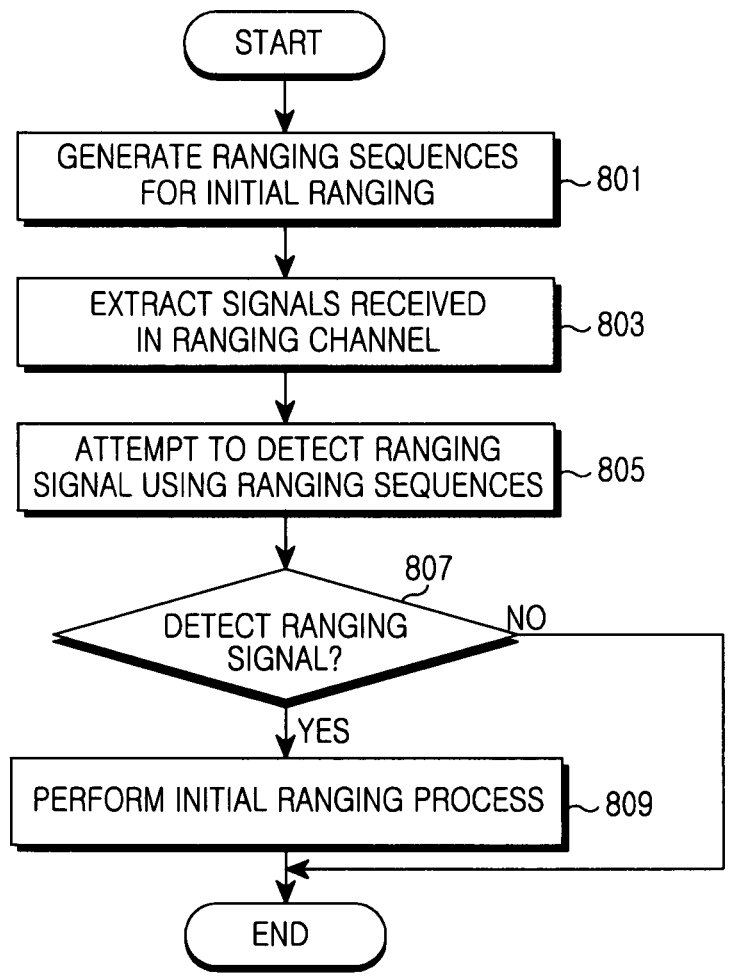
FIG. 8 illustrates a method for detecting the ranging signal of the base station in the broadband wireless communication system according to an exemplary embodiment of the present invention.

FIG. 8 illustrates a method for detecting the ranging signal of the base station in the broadband wireless communication system according to an exemplary embodiment of the present invention.

In step 801, the base station generates the ranging sequences for the initial ranging. Herein, the ranging sequences for the initial ranging are all or some of the sequences that can be generated according to Equation 1 through Equation 5. The base station generates at least one Zadoff-Chu sequence according to the root index defined for the ranging sequences, and generates at least one covering code by multiplying by the orthogonal codes according to the orthogonal code indexes defined for the ranging sequences. Next, the base station generates at least one base sequence by multiplying the at least one Zadoff-Chu sequence by the at least one covering code. The base station cyclic-shifts the at least one base sequence according to the offset defined for the ranging sequences, and generates the plurality of the ranging sequences by multiplying the master covering sequence.

In step 803, the base station extracts the signals received over the ranging channel. In more detail, the base station splits the signal received via the antenna to the OFDM symbols, removes the CP, restores the complex signals mapped to the tones through the FFT operation, and extracts the signals mapped to the ranging tones.

In step 805, the base station attempts to detect the ranging signal using the ranging sequences for the initial ranging. More specifically, the base station correlates the signal string extracted from the ranging channel with the ranging sequences for the initial ranging, and checks the peak values of the correlations corresponding to the ranging sequences. For example, when the number of the ranging sequences for the initial ranging is N, the base station performs the correlation N times.

In step 807, the base station determines whether the ranging signal is detected. That is, the base station determines whether there exists the ranging sequence producing the peak value greater than a threshold according to the result of the correlation.

Upon detecting the ranging signal, the base station performs the initial ranging process with the terminal which sends the detected ranging signal in step 809. After detecting the ranging signal, the base station allocates the resource to the terminal for the initial ranging process and conducts the initial ranging process through the signaling using the allocated resource.

In FIG. 8, before detecting the ranging signal, the base station directly generates the ranging sequences defined for the initial ranging. Yet, in other exemplary embodiments, the base station can use a pre-stored table. In this case, the terminal looks up the ranging sequence corresponding to the selected index in the pre-stored table in step 801. In further detail, the terminal stores the table of the mapping relation between the combinations of at least two of the root index of the Zadoff-Chu sequence, the orthogonal code indexes, and the cyclic shift offset, and the ranging sequences, and searches the ranging sequence corresponding to the index combinations defined for the ranging sequence in the table. Herein, the table arranges the ranging sequences generated according to Equation 1 through Equation 5, which can be at least one of Table 1 through Table 10.

Figure 9:
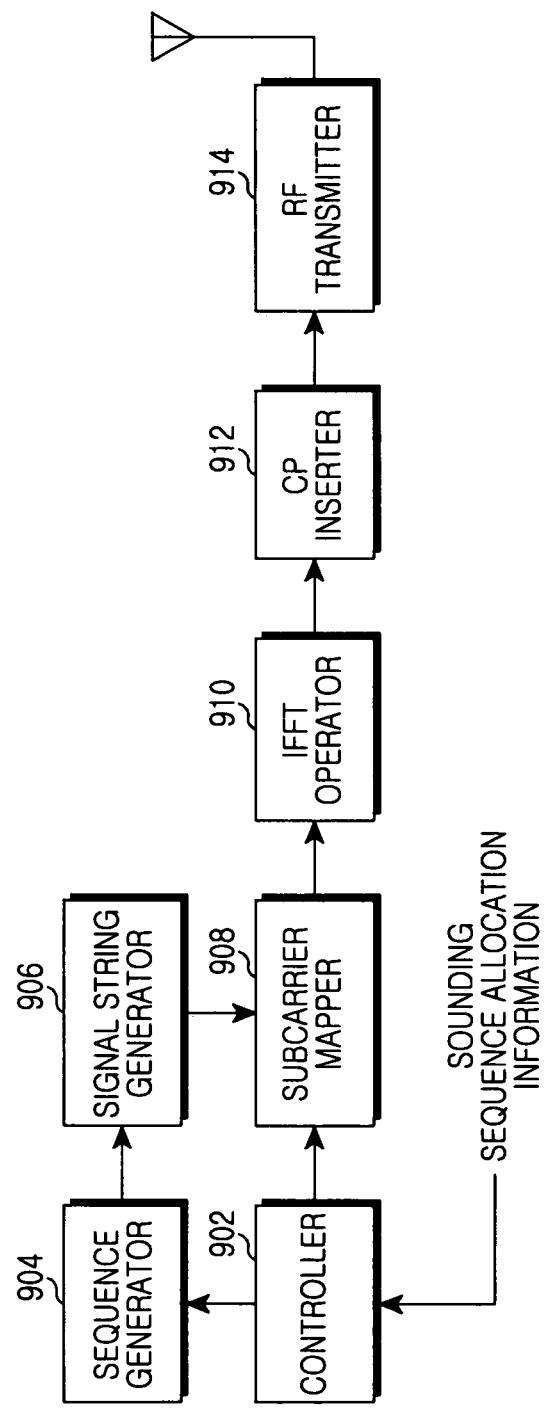
FIG. 9 illustrates the terminal structure in the broadband wireless communication system according to an exemplary embodiment of the present invention.

FIG. 9 is a block diagram of the terminal in the broadband wireless communication system according to an exemplary embodiment of the present invention.

The terminal of FIG. 9 includes a controller 902, a sequence generator 904, a signal string generator 906, a subcarrier mapper 908, an IFFT operator 910, a CP inserter 912, a Radio Frequency (RF) transmitter 914.

The controller 902 controls the functions of the terminal. For example, the controller 902 provides the sequence generator 904 with the sounding sequence allocation information and the index selection information of the ranging sequence so as to generate the sounding sequence and the ranging sequence. The controller 902 determines the common covering code index required for the sounding sequence generation. The common covering code index is contained in the sequence allocation information received from the base station, or determined by the controller 902 by the agreed rule. For instance, the agreed rule can rely on the type of the wirelessly accessed node. More particularly, the common covering code index is 0 when the terminal accesses the macro base station, and is derived from the cell ID when the terminal accesses the femto base station or the relay station. The controller 902 informs the subcarrier mapper 908 of the locations of the sounding tones and the ranging tones so as to map the sounding signal to the sounding channel and the ranging signal to the ranging channel.

The sequence generator 904 generates the sounding sequence and the ranging sequence. The sequence generator 904 directly creates the sequences according to Equation 1 through Equation 5, or looks up the sequence in the pre-stored table such as Table 1 through Table 10. The signal string generator 906 generates the complex signal string corresponding to the sequence output from the sequence generator 904.

The subcarrier mapper 908 maps the signals output from the signal string generator 906 to the sounding tones or the ranging tones under the control of the controller 902. The IFFT operator 910 converts the signals mapped to the tones output from the subcarrier mapper 908 to the time-domain signal through the IFFT operation. The CP inserter 912 constitutes the OFDM symbols by inserting the CP into the time-domain signal output from the IFFT operator 910. The RF transmitter 914 up-converts the OFDM symbols output from the CP inserter 912 to an RF signal and sends the RF signal via an antenna.

Based on the terminal structure of FIG. 9, the operations of the blocks for transmitting the sounding signal and the ranging signal are explained.

To transmit the sounding signal, the controller 902 provides the sounding sequence allocation information received from the base station to the sequence generator 904. Herein, the sounding sequence allocation information includes the sounding sequence length, the root index of the Zadoff-Chu sequence, the orthogonal code indexes, the cyclic shift offset, and the master covering sequence index. When the system uses only one Zadoff-Chu sequence, the sounding sequence allocation information includes the sounding sequence length, the orthogonal code indexes, the cyclic shift offset, and the master covering sequence index. Alternatively, the sounding sequence allocation information includes at least one of the base sounding sequence index, the cyclic shift offset, and the master covering sequence index. When the master covering sequence is allocated by the base station, the sounding sequence allocation information includes the master covering sequence index. By contrast, when the master covering sequence is determined by the pre-agreed rule, the sounding sequence allocation information does not include the master covering sequence index. Accordingly, the sequence generator 904 looks up the sounding sequence corresponding to the allocation information in the pre-stored table such as Table 1 through Table 10, or generates the sounding sequence according to Equation 1 through Equation 5. The structure and the functions of the sequence generator 904 shall be elucidated by referring to FIGS. 11 and 12. The signal string generator 906 receiving the sounding sequence from the sequence generator 904 generates the sounding signal according to the sounding sequence. More specifically, the signal string generator 906 generates the complex signal string corresponding to the P-ary elements constituting the sounding sequence. The signal string generator 906 provides the sounding signal to the subcarrier mapper 908, and the controller 902 informs the subcarrier mapper 908 of the locations of the sounding tones to which the sounding signal is mapped. Herein, the sounding tones are positioned at the preset locations, or at the locations allocated from the base station. Thus, the subcarrier mapper 908 maps the complex signals constituting the sounding signal to the sounding tones. Next, the sounding signal mapped to the sounding tones is transmitted through the antenna via the IFFT operator 910, the CP inserter 912, and the RF transmitter 914.

To send the ranging signal, the controller 902 selects the index combination of the ranging sequence for the initial ranging and informs the sequence generator 904 of the selected index combination. Herein, the index combination of the ranging sequence includes the root index of the Zadoff-Chu sequence, the orthogonal code indexes, the cyclic shift offset, and the master covering sequence index. When the system uses only one Zadoff-Chu sequence, the index combination of the ranging sequence includes the orthogonal code indexes, the cyclic shift offset, and the master covering sequence index. Alternatively, the sounding sequence allocation information includes at least one of the base sounding sequence index, the cyclic shift offset, and the master covering sequence index. When the master covering sequence is allocated by the base station, the sounding sequence allocation information includes the master covering sequence index. By contrast, when the master covering sequence is determined by the pre-agreed rule, the sounding sequence allocation information does not include the master covering sequence index. Accordingly, the sequence generator 904 looks up the ranging sequence corresponding to the allocation information in the pre-stored table such as Table 1 through Table 10, or generates the ranging sequence according to Equation 1 through Equation 5. The structure and the functions of the sequence generator 904 shall be described by referring to FIGS. 11 and 12. The signal string generator 906 receiving the ranging sequence from the sequence generator 904 generates the ranging signal according to the ranging sequence. More specifically, the signal string generator 906 generates the complex signal string corresponding to the N-ary elements constituting the ranging sequence. The signal string generator 906 provides the ranging signal to the subcarrier mapper 908, and the controller 902 informs the subcarrier mapper 908 of the locations of the ranging tones to which the ranging signal is mapped. The subcarrier mapper 908 maps the complex signals constituting the ranging signal to the ranging tones. Next, the ranging signal mapped to the ranging tones is transmitted through the antenna via the IFFT operator 910, the CP inserter 912, and the RF transmitter 914. Next, the controller 902 is allocated the resource for the initial ranging process from the base station and carries out the initial ranging process through the signaling using the allocated resource.

Figure 10:
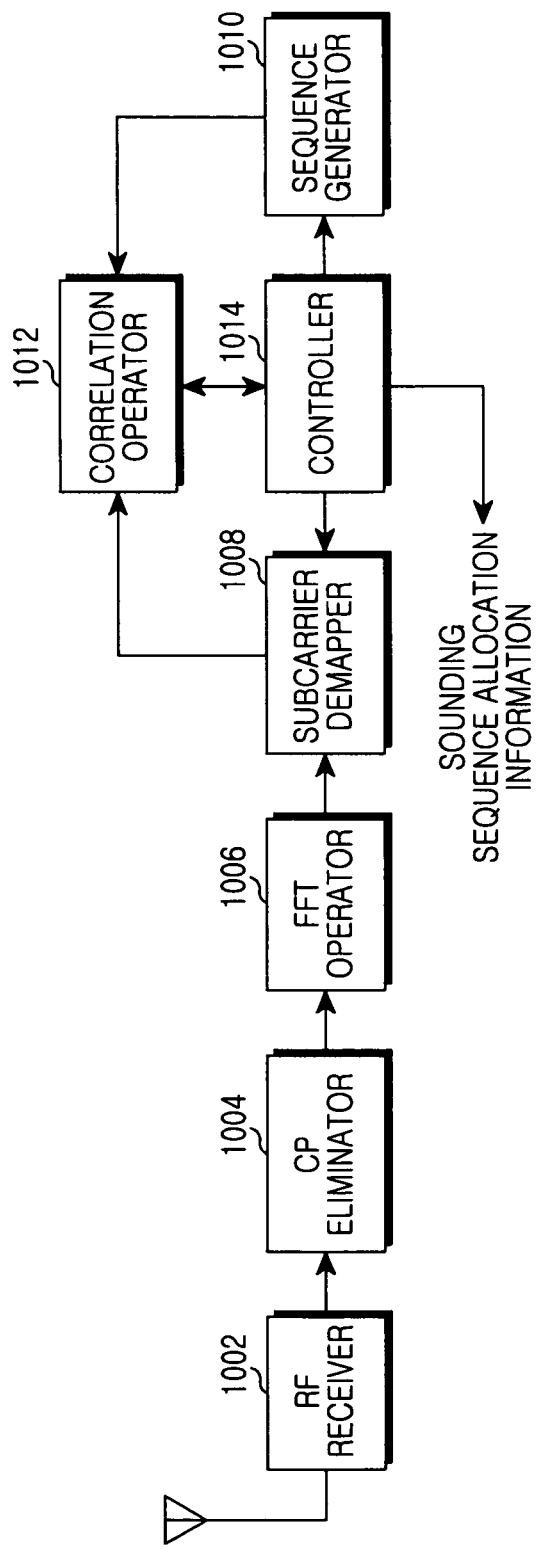
FIG. 10 illustrates the base station structure in the broadband wireless communication system according to an exemplary embodiment of the present invention.

FIG. 10 is a block diagram of the base station structure in the broadband wireless communication system according to an exemplary embodiment of the present invention.

The base station of FIG. 10 includes an RF receiver 1002, a CP eliminator 1004, an FFT operator 1006, a subcarrier demapper 1008, a sequence generator 1010, a correlation operator 1012, and a controller 1014.

The RF receiver 1002 down-converts the RF signal received via the antenna. The CP eliminator 1004 splits the signal output from the RF receiver 1002 to the OFDM symbols and removes the CP. The FFT operator 1006 recovers the signals mapped to tones from the time-domain signal output from the CP eliminator 1004. Under the control of the controller 1014, the subcarrier demapper 1008 extracts the signals mapped to the sounding tones and the ranging tones and provides the extracted signals to the correlation operator 1012.

The sequence generator 1010 generates the sounding sequence and the ranging sequence. The sequence generator 1010 directly generates the sequences according to Equation 1 through Equation 5, or looks up the sequence in the pre-stored table such as Table 1 through Table 10. The correlation operator 1012 correlates the sequence output from the sequence generator 1010 with the signal string output from the subcarrier demapper 1008, and provides the correlation result to the controller 1014.

The controller 1014 controls the functions of the base station. For example, the controller 1014 allocates the sounding sequence to the terminal. To extract the sounding signal in the sounding channel and the ranging signal in the ranging channel, the controller 1014 informs the subcarrier demapper 1008 of the locations of the sounding tones and the ranging tones. To generate the sounding sequence and the ranging sequence, the controller 1014 provides the sequence generator 1010 with the sounding sequence allocation information and the index selection information of the ranging sequence. In so doing, the controller 1014 determines the common covering code index required for the sounding sequence generation. The common covering code index is determined by the controller 1014 based on the agreed rule. For example, the agreed rule can rely on the type of the wirelessly accessed node. The common covering code index is '0' in the access to the macro base station, and is derived from the cell ID in the access to the femto base station or the relay station.

Based on the base station constituted as shown in FIG. 10, the operations of the blocks for detecting the sounding signal and the ranging signal are now described.

To detect the sounding signal, the controller 1014 allocates the sounding sequence to the terminal and transmits the sounding sequence allocation information to the terminal. The sounding sequence allocation information includes the sounding sequence length, the root index of the Zadoff-Chu sequence, the orthogonal code indexes, the cyclic shift offset, and the master covering sequence index. When the system uses only one Zadoff-Chu sequence, the sounding sequence allocation information includes the sounding sequence length, the orthogonal code indexes, the cyclic shift offset, and the master covering sequence index. Alternatively, the sounding sequence allocation information includes at least one of the base sounding sequence index, the cyclic shift offset, and the master covering sequence index. When the master covering sequence is allocated by the base station, the sounding sequence allocation information includes the master covering sequence index. By contrast, when the master covering sequence is determined by the pre-agreed rule, the sounding sequence allocation information does not include the master covering sequence index. Next, the subcarrier demapper 1008 extracts the signals received over the sounding channel from the signals mapped to the tones recovered through the RF receiver 1002, the CP eliminator 1004, and the FFT operator 1006. Herein, the sounding tones are positioned at the preset locations, or at the locations allocated for the sounding signal transmission of the terminal. The sequence generator 1010 generates the sounding sequence allocated to the terminal according to the sounding sequence allocation information provided from the controller 1014. That is, the sequence generator 1010 looks up the ranging sequence corresponding to the allocation information in the pre-stored table such as Table 1 through Table 10, or generates the ranging sequence according to Equation 1 through Equation 5. The structure and the functions of the sequence generator 1010 shall be described by referring to FIGS. 11 and 12. The correlation operator 1012, receiving the sounding sequence from the sequence generator 1010 and the signal string from the subcarrier demapper 1008, detects the sounding signal of the terminal. Herein, the detection of the sounding signal estimates the channel coefficient with respect to the terminal. More specifically, the correlation operator 1012 multiples the conjugate values of the signal string extracted by the subcarrier demapper 1008 by the sounding sequence generated by the sequence generator 1010, and provides the product to the controller 1014. Hence, the controller 1014 acquires the channel coefficient for the terminal.

To detect the ranging signal, the controller 1014 provides the sequence generator 1010 with the index information of the ranging sequences defined for the initial ranging so as to generate the ranging sequences for the initial ranging. Hence, the sequence generator 1010 generates the ranging sequences according to the index information provided from the controller 1014. The sequence generator 1010 looks up the sequences corresponding to the index information in the pre-stored table such as Table 1 through Table 10, or generates the sequences corresponding to the index information according to Equation 1 through Equation 5. The structure and the functions of the sequence generator 1010 will be described by referring to FIGS. 11 and 12. Next, the subcarrier demapper 1008 extracts the signals received in the ranging channel from the signals mapped to the tones recovered through the RF receiver 1002, the CP eliminator 1004, and the FFT operator 1006. Next, the subcarrier demapper 1008 provides the signal string received in the ranging channel to the correlation operator 1012. The controller 1010 controls the sequence generator 1010 to output the ranging sequences defined for the initial ranging. The correlation operator 1012, receiving the signal string from the subcarrier demapper 1008 and the ranging sequences from the sequence generator 1010, attempts to detect the ranging signal using the ranging sequences. In other words, the correlation operator 1012 correlates the signal string extracted from the ranging channel with the ranging sequences for the initial ranging, and provides the controller 1014 with the peak values of the correlation corresponding to the ranging sequences. Upon receiving the peak values of the correlation corresponding to the ranging sequences, the controller 1014 checks whether there exists the ranging sequence producing the peak value greater than the threshold according to the result of the correlation; that is, checks whether the ranging signal is detected, and then performs the initial ranging process with the terminal which sends the detected ranging signal. That is, the controller 1014 allocates the resource for the initial ranging process to the terminal, and conducts the initial ranging process through the signaling using the allocated resource.

Figure 11:
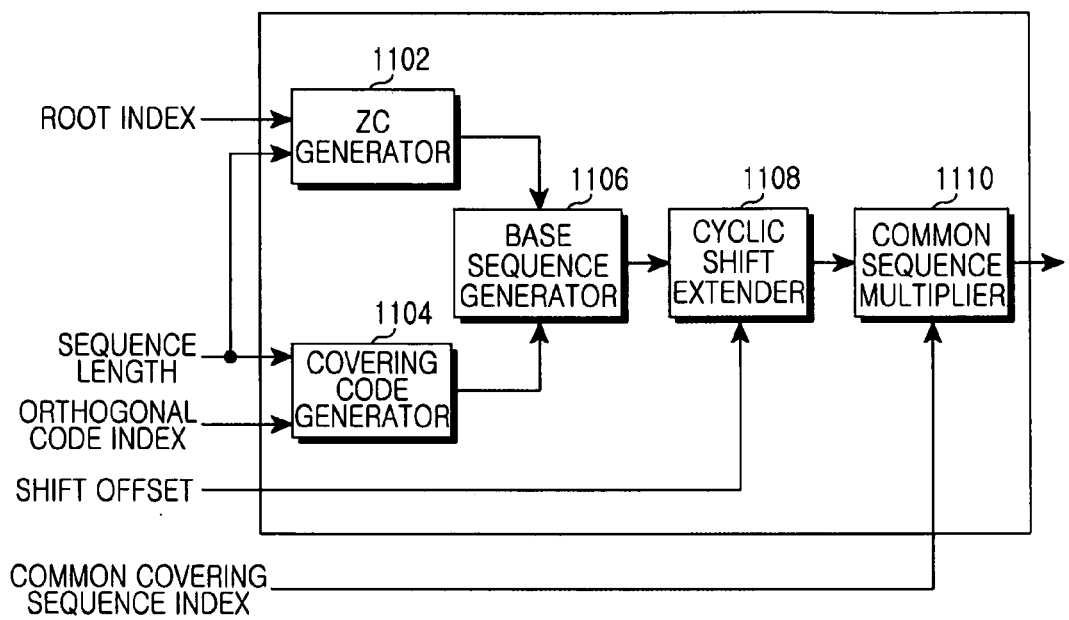
FIG. 11 illustrates a sequence generator in the broadband wireless communication system according to one exemplary embodiment of the present invention.

FIG. 11 is a block diagram of the sequence generator 904 and 1010 in the broadband wireless communication system according to one exemplary embodiment of the present invention.

The sequence generator 904 and 1010 of FIG. 11 includes a Zadoff-Chu (ZC) generator 1102, a covering code generator 1104, a base sequence generator 1106, a cyclic shift extender 1108, and a common sequence multiplier 1110.

The ZC generator 1102 generates the ZC sequence according to the root index of the ZC sequence and the sequence length contained in the sounding sequence allocation information or the ranging sequence index information provided from the controller 902 or 1014. For example, the ZC generator 1102 generates the ZC sequence according to Equation 1. When the system uses only one ZC sequence, the ZC generator 1102 generates the ZC sequence according to the sequence length and the fixed root index.

The covering code generator 1104 generates the covering code according to the sequence length and the orthogonal code indexes of the sounding sequence allocation information or the ranging sequence index information provided from the controller 902 and 1014. For example, the covering code generator 1104 generates the covering code according to Equation 3. More specifically, the covering code generator 1104 generates the covering code by multiplying the two orthogonal codes defined based on the orthogonal code index u,l, the first constant s, and the second constant m. The first constant s and the second constant m corresponding to the sequence length are predefined. The covering code generator 1104 searches the first constant s and the second constant m corresponding to the sequence length and then generates the covering code.

The base sequence generator 1106 generates the base sequences using the ZC sequence output from the ZC generator 1102 and the covering code output from the covering code generator 1104. For example, the base sequence generator 1106 generates the base sequence according to Equation 4. More particularly, the base sequence generator 1106 acquires the base sequence by multiplying the ZC sequence by the covering code.

The cyclic shift extender 1108 cyclic-shifts the base sequence output from the base sequence generator 1106 according to the cyclic shift index fed from the controller 902 and 1014.

The common sequence multiplier 1110 multiples the base sequence cyclic-shifted by the cyclic shift extender 1108 by the master covering sequence for the PAPR reduction. The master covering sequence is generated according to the master covering sequence index provided from the controller 902 and 1014. For example, the master covering sequence can employ one of the Golay sequence, the random sequence, the All-one sequence, and the sequence given by Equation 6. By multiplying the master covering sequence, the sounding sequence or the ranging sequence is produced. For example, the cyclic shift extender 1108 and the common sequence multiplier 1110 yield the sounding sequence or the ranging sequence according to Equation 5.

Figure 12:
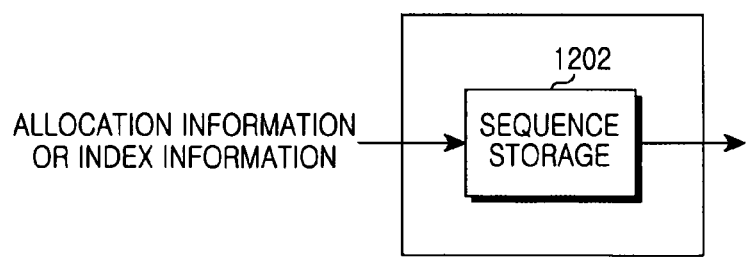
FIG. 12 illustrates a sequence generator in the broadband wireless communication system according to another exemplary embodiment of the present invention.

FIG. 12 is a block diagram of the sequence generator 904 and 1010 in the broadband wireless communication system according to another exemplary embodiment of the present invention.

The sequence generator 904 and 1010 of FIG. 12 includes a sequence storage 1202.

The sequence storage 1202 stores the sequences obtained from Equation 1 through Equation 5. The sequences are indexed with the combinations of at least two of the sequence length, the root index of the ZC sequence, the orthogonal code indexes, and the cyclic shift offset. For instance, the sequence storage 1202 stores at least one of Table 1 through Table 10. When the controller 902 and 1014 provides the sounding sequence allocation information or the ranging sequence index information, the sequence storage 1202 retrieves the sequence corresponding to the allocation information or the index information and then outputs the retrieved sequence.

The sequences in Table 1 through Table 10 are the base sounding sequences before the cyclic shifting and the master covering sequence are applied. Although they are not illustrated in the drawing, the sequence generator 904 and 1010 further includes the cyclic shift extender 1108 and the common sequence multiplier 1110 of FIG. 11. The cyclic shift extender 1108 cyclic-shifts the base sequence output from the sequence storage 1202 according to the cyclic shift index fed from the controller 902 and 1014. The common sequence multiplier 1110 generates the master covering sequence according to the master covering sequence index fed from the controller 902 and 1014 and multiplies the master covering sequence by the cyclic-shifted base sounding sequence. Therefore, the sounding sequence is produced.

Figure 13A:
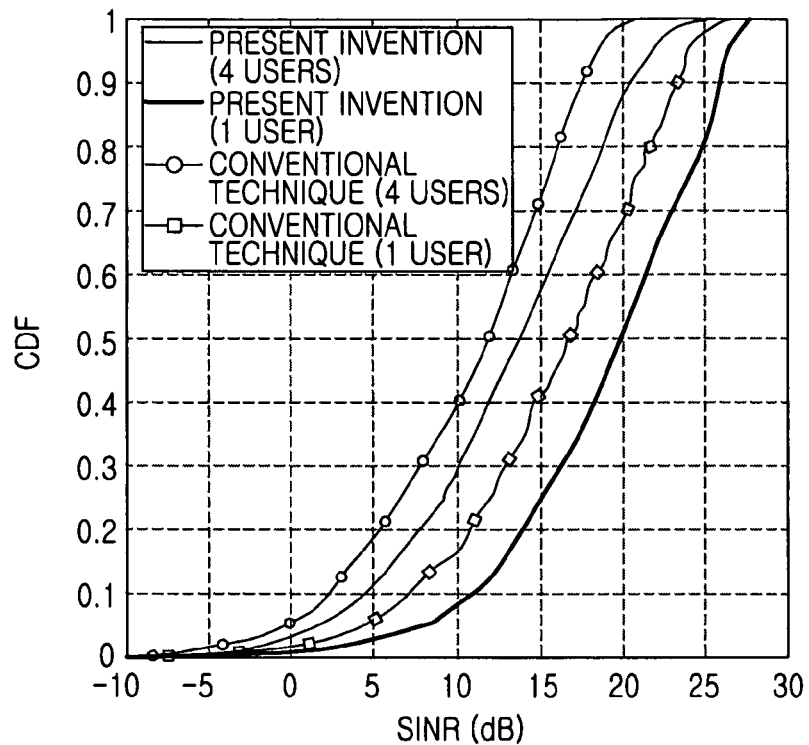
FIGS. 13A and 13B illustrates the sounding channel quality in the broadband wireless communication system according to an exemplary embodiment of the present invention.
Figure 13B:
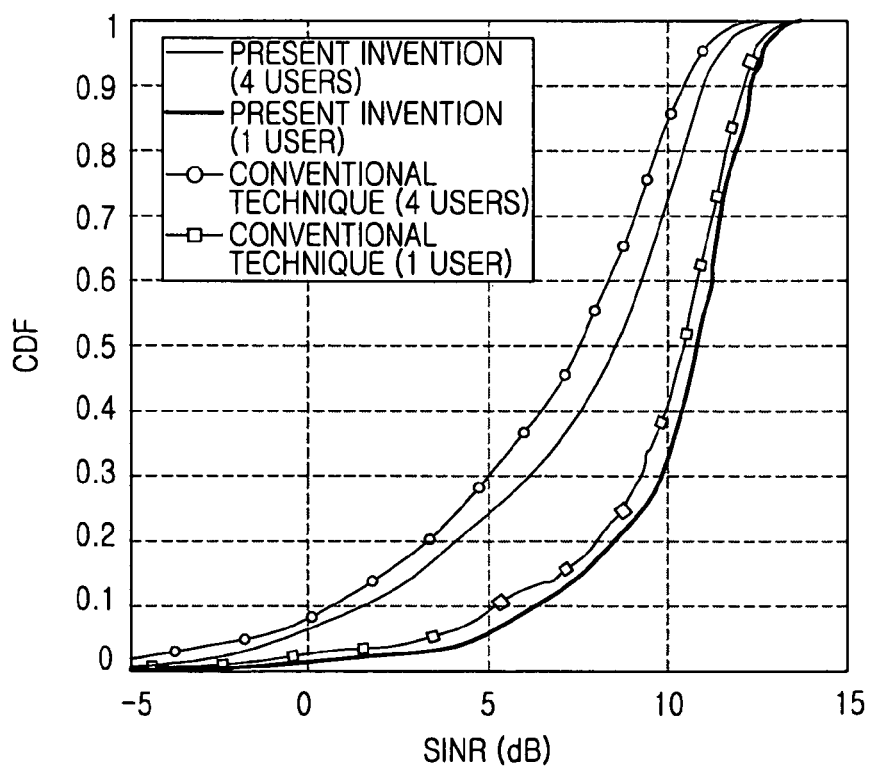

FIGS. 13A and 13B depict the sounding channel quality in the broadband wireless communication system according to an exemplary embodiment of the present invention, where the performances of the present invention and the conventional technique are compared. FIG. 13A shows Signal to Interference and Noise Ratio (SINR) when the channel is Ped-A which is a mobile communication channel model recommended by International Telecommunication Union-Radiocommunication sector (ITU-R), and FIG. 13B shows the SINR when the channel is Ped-B which is a mobile communication channel model recommended by the ITU-R. In FIGS. 13A and 13B, the horizontal axis indicates the sounding SINR of the users after the sounding processing, and the vertical axis indicates the probability that the sounding SINR is lower than the SINR of the horizontal axis. Herein, the conventional technique adopts the DFT orthogonal code using the Golay code with the cell-specific offset applied, as the scrambling code. Compared with the conventional technique, the present invention enhances the average (CDF=0.5) value by 1.5~3 dB in the Ped-A channel as shown in FIG. 13A and exhibits the performance enhancement of 0.5~1.1 dB in the Ped-B channel as shown in FIG. 13B.

Figure 14:
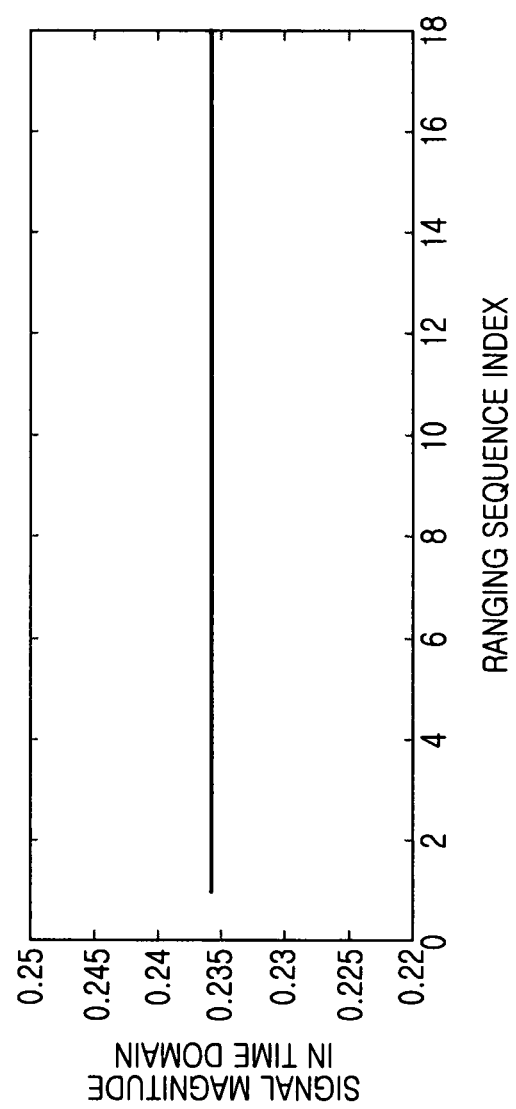
FIG. 14 illustrates the signal magnitude distribution of the ranging signal in the broadband wireless communication system according to an exemplary embodiment of the present invention.

FIG. 14 depicts the ranging signal characteristics in the broadband wireless communication system according to an exemplary embodiment of the present invention. In FIG. 14, the horizontal axis indicates the index of the ranging sequence and the vertical axis indicates the magnitude of the ranging signal in the time domain. Even when the time-domain index of the ranging sequence varies, the magnitude of the ranging signal is constant as shown in FIG. 14. Thus, under the condition of the same power amplifier, the ranging coverage can be increased by increasing the efficiency of the transmit power, compared to the method which varies the magnitude of the signal on the time domain.

In the broadband wireless communication system, the sounding and the ranging are carried out by use of the sequences which are generated using the covering code including the plurality of the orthogonal codes based on the ZC sequence and extended through the cyclic-shift. Thus, the influence of the ICI can be mitigated. The performance of the sounding and the ranging can be improved. Further, the performance of the sounding and the ranging can be far more enhanced by lowering the PAPR of the sequence by multiplying the cyclic-shifted base sequence by the master covering sequence.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An operating method of a transmitting end for transmitting an orthogonal sequence in a wireless communication system, the method comprising:
   generating a sequence corresponding to sequence allocation information of the transmitting end among a plurality of candidate sequences;
   generating a signal string corresponding to the generated sequence; and
   transmitting the signal string over a channel defined for transmission of the signal string,
   wherein the sequence allocation information indicates a combination of at least one of a sequence length, a Zadoff-Chu sequence root index, orthogonal code indexes, and a cyclic shift offset, and
   the plurality of the candidate sequences comprises sequences that are obtained by extending a product of a covering code comprising a plurality of orthogonal codes and a Zadoff-Chu sequence through cyclic shift and multiplying the extended product by a master covering sequence, the extending through the cyclic shift and the multiplying being performed before an Inverse Fast Fourier Transform (IFFT), and
   wherein the covering code comprises a first orthogonal code to enhance a correlation characteristic and a second orthogonal code to increase the number the plurality of the candidate sequences.

2. The method of claim 1, wherein the generating of the sequence comprises:
   looking up the sequence in a table which arranges mapping relation between the sequence allocation information and the plurality of the candidate sequences.

3. The method of claim 1, wherein the generating of the sequence comprises:
   generating the Zadoff-Chu sequence according to the Zadoff-Chu sequence root index;
   generating the covering code by multiplying the plurality of the orthogonal codes according to the orthogonal code indexes;
   generating a base sequence by multiplying the Zadoff-Chu sequence by the covering code;
   cyclic-shifting the base sequence according to the cyclic shift offset; and
   generating the sequence by multiplying the cyclic-shifted base sequence by the master covering sequence.

4. The method of claim 1, wherein, when a length of the generated sequence is even, the Zadoff-Chu sequence is given by:

$$a_r[n]=e^{-j\pi rn^2/P}, n=0,1\ldots P-1, \text{ when } P \text{ is even}$$

where $a_r[n]$ denotes an n-th element of the Zadoff-Chu sequence, n denotes a tone index, r denotes the root index of the Zadoff-Chu sequence, P denotes a length of the Zadoff-Chu sequence, and n and r are integers greater than 0 and less than P−1, and when the length of the generated sequence is odd, the Zadoff-Chu sequence is given by:

$$a_r[n]=e^{-j\pi rn(n+1)/P}, n=0,1\ldots P-1, \text{ when } P \text{ is odd}$$

where $a_r[n]$ denotes the n-th element of the Zadoff-Chu sequence, n denotes the tone index, r denotes the root index of the Zadoff-Chu sequence, P denotes the length of the Zadoff-Chu sequence, and n and r are integers greater than 0 and less than P−1.

5. The method of claim 4, wherein the plurality of the orthogonal codes is given by:

$$v_{u,l}[n] = b_u[n \bmod m]c_l[\lceil n/m \rceil]$$
$$= e^{-j2\pi u(n \bmod m)/m} e^{-j2\pi l\lceil n/m \rceil/sm},$$

$$u = 0, 1 \ldots m-1;$$
$$l = 0, 1 \ldots sm-1$$

where $v_{u,l}[n]$ is an n-th element of the covering code with the index u,l, u is the index of the first orthogonal code, l is the index of the second orthogonal code, n is the tone index, $b_u$ is the first orthogonal code of the index u, m is a second constant constituting P, $c_l$ is the second orthogonal code of the index l, $\lceil \cdot \rceil$ is a round-up operator, s is a first constant constituting P, u is an integer greater than 0 and less than m−1, and l is an integer greater than 0 and less than sm−1, and
the plurality of candidate sequences are given by:

$$C_{q,r,u,l}[k]=g_{r,u,l}[(k+q) \bmod P]f[k], k=0,1\ldots N_{used}-1$$

where $C_{q,r,u,l}[k]$ denotes a k-th element of a sounding sequence with the index q,r,u,l, q denotes the cyclic shift offset, $q_{r,u,l}$ denotes a base sounding sequence with the index r,u,l, k denotes the tone index, P denotes a length of the sounding sequence, f[k] denotes a k-th element of the master covering sequence, and $N_{used}$ denotes a number of usable tones for sending the sounding sequence.

6. The method of claim 5, wherein the master covering sequence is one of a Golay Sequence, a random sequence, a All-one sequence, and a sequence given by:

$$f[k] = e^{-\frac{j\pi y((k+d) \bmod N_G)((k+d+1) \bmod N_G)}{N_G}}$$

where f[k] denotes the k-th element of the master covering sequence, k denotes the tone index, $N_G$ denotes a minimum prime number among positive integers greater than the total number of tones, y denotes a value selected to minimize a Peak to Average Power Ratio (PAPR) of the sounding sequence among positive integers between 1 and $N_G-1$, and d denotes the index of the master covering sequence for increasing a number of sounding sequences.

7. The method of claim 1, wherein the generated sequence is a reference signal sequence for downlink channel estimation.

8. The method of claim 1, wherein the generated sequence is a sounding sequence for uplink channel estimation, and further comprising:
   receiving sounding sequence allocation information from a base station.

9. The method of claim 1, wherein the generated sequence is a ranging sequence for initial ranging.

10. An operating method of a receiving end for receiving an orthogonal sequence in a wireless communication system, the method comprising:

generating a sequence corresponding to sequence allocation information of a transmitting end among a plurality of candidate sequences;

receiving a signal string over a channel for carrying the orthogonal sequence from the transmitting end; and correlating the signal string with the generated sequence, wherein the sequence allocation information indicates a combination of at least one of a sequence length, a Zadoff-Chu sequence root index, orthogonal code indexes, and a cyclic shift offset, and the plurality of candidate sequences comprises sequences that are obtained by extending a product of a covering code comprising a plurality of orthogonal codes and a Zadoff-Chu sequence through cyclic shift and multiplying the extended product by a master covering sequence, the extending through the cyclic shift and the multiplying being performed before an Inverse Fast Fourier Transform (IFFT), and wherein the covering code comprises a first orthogonal code to enhance a correlation characteristic and a second orthogonal code to increase the number of the plurality of candidate sequences.

11. The method of claim 10, wherein the generating the sequence comprises:

looking up the sequence corresponding to the sequence allocation information in a table which arranges mapping relation between the sequence allocation information and the plurality of candidate sequences.

12. The method of claim 10, wherein the generating the sequence comprises:

generating the Zadoff-Chu sequence according to the Zadoff-Chu sequence root index;

generating the covering code by multiplying the plurality of the orthogonal codes according to the orthogonal code indexes;

generating a base sequence by multiplying the Zadoff-Chu sequence by the covering code;

cyclic-shifting the base sequence according to the offset; and generating the sequence by multiplying the cyclic-shifted base sequence by the master covering sequence.

13. The method of claim 10, wherein, when a length of the generated sequence is even, the Zadoff-Chu sequence is given by:

$$a_r[n]=e^{-j\pi r n^2 P}, n=0,1 \ldots P-1, \text{when } P \text{ is even}$$

where $a_r[n]$ denotes an n-th element of the Zadoff-Chu sequence, n denotes a tone index, r denotes the root index of the Zadoff-Chu sequence, P denotes a length of the Zadoff-Chu sequence, and n and r are integers greater than 0 and less than P−1, and when the length of the generated sequence is odd, the Zadoff-Chu sequence is given by:

$$a_r[n]=e^{-j\pi r n(n+1)/P}, n=0,1 \ldots P-1, \text{when } P \text{ is odd}$$

where $a_r[n]$ denotes the n-th element of the Zadoff-Chu sequence, n denotes the tone index, r denotes the root index of the Zadoff-Chu sequence, P denotes the length of the Zadoff-Chu sequence, and n and r are integers greater than 0 and less than P−1.

14. The method of claim 13, wherein the plurality of the orthogonal codes is given by:

$$v_{u,l}[n] = b_u[n \bmod m]c_l[\lceil n/m \rceil]$$
$$= e^{-j2\pi u(n \bmod m)/m} e^{-j2\pi l \lceil n/m \rceil/sm},$$

$u = 0, 1 \ldots m-1;$
$l = 0, 1 \ldots sm-1$ where $v_{u,l}[n]$ is an n-th element of the covering code with the index u,l, u is the index of the first orthogonal code, l is the index of the second orthogonal code, n is the tone index, $b_u$ is the first orthogonal code of the index u, m is a second constant constituting P, $c_l$ is the second orthogonal code of the index l, $\lceil \cdot \rceil$ is a round-up operator, s is a first constant constituting P, u is an integer greater than 0 and less than m−1, and l is an integer greater than 0 and less than sm−1, and the plurality of candidate sequences are given by:

$$C_{q,r,u,l}[k]=g_{r,u,l}[(k+q) \bmod P]f[k], k=0,1 \ldots N_{used}-1$$

where $C_{q,r,u,l}[k]$ denotes a k-th element of a sounding sequence with the index q,r,u,l, q denotes the cyclic shift offset, $g_{r,u,l}$ denotes a base sounding sequence with the index r,u,l, k denotes the tone index, P denotes a length of the sounding sequence, f[k] denotes a k-th element of the master covering sequence, and $N_{used}$ denotes a number of usable tones for sending the sounding sequence.

15. The method of claim 14, wherein the master covering sequence is one of a Golay Sequence, a random sequence, a All-one sequence, and a sequence given by:

$$f[k] = e^{-\frac{j\pi y((k+d) \bmod N_G)((k+d+1) \bmod N_G)}{N_G}}$$

where f[k] denotes the k-th element of the master covering sequence, k denotes the tone index, $N_G$ denotes a minimum prime number among positive integers greater than the total number of tones, y denotes a value selected to minimize a Peak to Average Power Ratio (PAPR) of the sounding sequence among positive integers between 1 and $N_G-1$, and d denotes the index of the master covering sequence for increasing a number of sounding sequences.

16. The method of claim 10, wherein the generated sequence is a reference signal sequence for downlink channel estimation.

17. The method of claim 10, wherein the generated sequence is a sounding sequence for uplink channel estimation.

18. The method of claim 10, wherein the generated sequence is a ranging sequence for initial ranging.

19. An apparatus of a transmitting end for transmitting an orthogonal sequence in a wireless communication system, the apparatus comprising:

a sequence generator configured to generate a sequence corresponding to sequence allocation information of the transmitting end among a plurality of candidate sequences;

a signal string generator configured to generate a signal string corresponding to the generated sequence; and a transmitter configured to transmit the signal string over a channel defined for transmission of the signal string, wherein the sequence allocation information indicates a combination of at least one of a sequence length, a Zadoff-Chu sequence root index, orthogonal code indexes, and a cyclic shift offset, and the plurality of the candidate sequences comprises sequences that are obtained by extending a product of a covering code comprising a plurality of orthogonal codes and a Zadoff-Chu sequence through cyclic shift and multiplying the extended product by a master covering sequence, the extending through the cyclic shift and the multiplying being performed before an Inverse Fast Fourier Transform (IFFT), and wherein the covering code comprises a first orthogonal code to enhance a correlation characteristic and a second orthogonal code to increase the number of the plurality of the candidate sequences.

20. The apparatus of claim 19, wherein the sequence generator is configured to look up the sequence in a table which arranges mapping relation between the sequence allocation information and the plurality of the candidate sequences.

21. The apparatus of claim 19, wherein the sequence generator comprises:
a Zadoff-Chu (ZC) generator configured to generate the Zadoff-Chu sequence according to the root index;
a covering code generator configured to generate the covering code by multiplying the plurality of the orthogonal codes according to the orthogonal code indexes;
a base sequence generator configured to generate a base sequence by multiplying the Zadoff-Chu sequence by the covering code;
a cyclic shift extender configured to cyclic-shift the base sequence according to the cyclic shift offset; and
a master covering sequence multiplier configured to generate the sequence by multiplying the cyclic-shifted base sequence by the master covering sequence.

22. The apparatus of claim 19, wherein, when a length of the generated sequence is even, the Zadoff-Chu sequence is given by:

$$a_r[n] = e^{-j\pi r n^2/P}, n=0,1 \ldots P-1, \text{when } P \text{ is even}$$

where $a_r[n]$ denotes an n-th element of the Zadoff-Chu sequence, n denotes a tone index, r denotes the root index of the Zadoff-Chu sequence, P denotes a length of the Zadoff-Chu sequence, and n and r are integers greater than 0 and less than P−1, and when the length of the generated sequence is odd, the Zadoff-Chu sequence is given by:

$$a_r[n] = e^{-j\pi r n(n+1)/P}, n=0,1 \ldots P-1, \text{when } P \text{ is odd}$$

where $a_r[n]$ denotes the n-th element of the Zadoff-Chu sequence, n denotes the tone index, r denotes the root index of the Zadoff-Chu sequence, P denotes the length of the Zadoff-Chu sequence, and n and r are integers greater than 0 and less than P−1.

23. The apparatus of claim 22, wherein the plurality of the orthogonal codes is given by the following equation:

$$v_{u,l}[n] = b_u[n \bmod m] c_l[\lceil n/m \rceil]$$
$$= e^{-j2\pi u(n \bmod m)/m} e^{-j2\pi l \lceil n/m \rceil/sm},$$

$$u = 0, 1 \ldots m-1;$$
$$l = 0, 1 \ldots sm-1$$

where $v_{u,l}[n]$ is an n-th element of the covering code with the index u,l, u is the index of the first orthogonal code, l is the index of the second orthogonal code, n is the tone index, $b_u$ is the first orthogonal code of the index u, m is a second constant constituting P, $c_l$ is the second orthogonal code of the index l, $\lceil \cdot \rceil$ is a round-up operator, s is a first constant constituting P, u is an integer greater than 0 and less than m−1, and l is an integer greater than 0 and less than sm−1, and the plurality of candidate sequences are given by:

$$C_{q,r,u,l}[k] = g_{r,u,l}[(k+q) \bmod P] f[k], k=0,1 \ldots N_{used}-1$$

where $C_{q,r,u,l}[k]$ denotes a k-th element of a sounding sequence with the index q,r,u,l, q denotes the cyclic shift offset, $g_{r,u,l}$ denotes a base sounding sequence with the index r,u,l, k denotes the tone index, P denotes a length of the sounding sequence, f[k] denotes a k-th element of the master covering sequence, and $N_{used}$ denotes a number of usable tones for sending the sounding sequence.

24. The apparatus of claim 23, wherein the master covering sequence is one of a Golay Sequence, a random sequence, a All-one sequence, and a sequence given by:

$$f[k] = e^{-\frac{j\pi y((k+d) \bmod N_G)((k+d+1) \bmod N_G)}{N_G}}$$

where f[k] denotes the k-th element of the master covering sequence, k denotes the tone index, $N_G$ denotes a minimum prime number among positive integers greater than the total number of tones, y denotes a value selected to minimize a Peak to Average Power Ratio (PAPR) of the sounding sequence among positive integers between 1 and $N_G-1$, and d denotes the index of the master covering sequence for increasing a number of sounding sequences.

25. The apparatus of claim 19, wherein the generated sequence is a reference signal sequence for downlink channel estimation.

26. The apparatus of claim 19, wherein the generated sequence is a sounding sequence for uplink channel estimation, and further comprising:
a controller for receiving sounding sequence allocation information from a base station.

27. The apparatus of claim 19, wherein the generated sequence is a ranging sequence for initial ranging.

28. An apparatus of a receiving end for receiving an orthogonal sequence in a wireless communication system, the apparatus comprising:
a sequence generator configured to generate a sequence corresponding to sequence allocation information of a transmitting end among a plurality of candidate sequences;
a receiver configured to receive a signal string over a channel for carrying the orthogonal sequence from the transmitting end; and
a correlation operator configured to correlate the signal string with the generated sequence,
wherein the sequence allocation information indicates a combination of at least one of a sequence length, a Zadoff-Chu sequence root index, orthogonal code indexes, and a cyclic shift offset, and
the plurality of candidate sequences comprises sequences that are obtained by extending a product of a covering code comprising a plurality of orthogonal codes and a Zadoff-Chu sequence through cyclic shift and multiplying the extended product by a master covering sequence, the extending through the cyclic shift and the multiplying being performed before an Inverse Fast Fourier Transform (IFFT), and
wherein the covering code comprises a first orthogonal code to enhance a correlation characteristic and a second orthogonal code to increase the number of the plurality of candidate sequences.

29. The apparatus of claim 28, wherein the sequence generator is configured to look up the sequence corresponding to the sequence allocation information in a table which arranges mapping relation between the sequence allocation information and the plurality of candidate sequences.

30. The apparatus of claim 28, wherein the sequence generator comprises:
- a Zadoff-Chu (ZC) generator configured to generate the Zadoff-Chu sequence according to the root index;
- a covering code generator configured to generate the covering code by multiplying the plurality of the orthogonal codes according to the orthogonal code indexes;
- a base sequence generator configured to generate a base sequence by multiplying the Zadoff-Chu sequence by the covering code;
- a cyclic shift extender configured to cyclic-shift the base sequence according to the cyclic shift offset; and
- a master covering sequence multiplier configured to generate the sequence by multiplying the cyclic-shifted base sequence by the master covering sequence.

31. The apparatus of claim 28, wherein, when a length of the generated sequence is even, the Zadoff-Chu sequence is given by:

$$a_r[n]=e^{-j\pi r n^2/P}, n=0,1\ldots P-1, \text{ when } P \text{ is even}$$

where $a_r[n]$ denotes an n-th element of the Zadoff-Chu sequence, n denotes a tone index, r denotes the root index of the Zadoff-Chu sequence, P denotes a length of the Zadoff-Chu sequence, and n and r are integers greater than 0 and less than P−1, and when the length of the generated sequence is odd, the Zadoff-Chu sequence is given by:

$$a_r[n]=e^{-j\pi r n(n+1)/P}, n=0,1\ldots P-1 \text{ when } P \text{ is odd}$$

where $a_r[n]$ denotes the n-th element of the Zadoff-Chu sequence, n denotes the tone index, r denotes the root index of the Zadoff-Chu sequence, P denotes the length of the Zadoff-Chu sequence, and n and r are integers greater than 0 and less than P−1.

32. The apparatus of claim 31, wherein the plurality of the orthogonal codes is given by:

$$v_{u,l}[n] = b_u[n \bmod m]c_l[\lceil n/m \rceil]$$
$$= e^{-j2\pi u(n \bmod m)/m}e^{-j2\pi l\lceil n/m \rceil/sm},$$

$$u = 0, 1 \ldots m-1;$$
$$l = 0, 1 \ldots sm-1$$

where $v_{u,l}[n]$ is an n-th element of the covering code with the index u,l, u is the index of the first orthogonal code, l is the index of the second orthogonal code, n is the tone index, $b_u$ is the first orthogonal code of the index u, m is a second constant constituting P, $c_l$ is the second orthogonal code of the index l, $\lceil \cdot \rceil$ is a round-up operator, s is a first constant constituting P, u is an integer greater than 0 and less than m−1, and l is an integer greater than 0 and less than sm−1, and the plurality of candidate sequences are given by:

$$C_{q,r,u,l}[k]=g_{r,u,l}[(k+q)\bmod P]f[k], k=0,1\ldots N_{used}-1$$

where $C_{q,r,u,l}[k]$ denotes a k-th element of a sounding sequence with the index q,r,u,l, q denotes the cyclic shift offset, $g_{r,u,l}$ denotes a base sounding sequence with the index r,u,l, k denotes the tone index, P denotes a length of the sounding sequence, f[k] denotes a k-th element of the master covering sequence, and $N_{used}$ denotes a number of usable tones for sending the sounding sequence.

33. The apparatus of claim 32, wherein the master covering sequence is one of a Golay Sequence, a random sequence, a All-one sequence, and a sequence given by:

$$f[k] = e^{-\frac{j\pi y((k+d)\bmod N_G)((k+d+1)\bmod N_G)}{N_G}}$$

where f[k] denotes the k-th element of the master covering sequence, k denotes the tone index, $N_G$ denotes a minimum prime number among positive integers greater than the total number of tones, y denotes a value selected to minimize a Peak to Average Power Ratio (PAPR) of the sounding sequence among positive integers between 1 and $N_G-1$, and d denotes the index of the master covering sequence for increasing a number of sounding sequences.

34. The apparatus of claim 28, wherein the generated sequence is a reference signal sequence for downlink channel estimation.

35. The apparatus of claim 28, wherein the generated sequence is a sounding sequence for uplink channel estimation.

36. The apparatus of claim 28, wherein the generated sequence is a ranging sequence for initial ranging.

* * * * *